United States Patent [19]
Boyle et al.

[11] Patent Number: 5,732,370
[45] Date of Patent: Mar. 24, 1998

[54] METHOD FOR CONTROLLING MOTION USING A TWO-STAGE ADJUSTABLE DAMPER

[75] Inventors: Frederick P. Boyle, Kirtland; Nicholas K. Petek, Cleveland Heights; Dale P. Smith, Cleveland, all of Ohio

[73] Assignee: The Lubrizol Corporation, Wickliffe, Ohio

[21] Appl. No.: 639,142

[22] Filed: Apr. 26, 1996

[51] Int. Cl.$^6$ .................... B60G 17/015; G06F 17/10
[52] U.S. Cl. .................. 701/37; 701/38; 280/707; 280/840; 248/550; 248/636; 267/136
[58] Field of Search ................... 701/36, 37, 38, 701/40; 280/707, 840; 180/41; 267/136; 248/550, 562, 636, 638

[56] References Cited

U.S. PATENT DOCUMENTS

| | | | |
|---|---|---|---|
| 3,807,678 | 4/1974 | Karnopp et al. | 248/358 |
| 4,468,050 | 8/1984 | Woods et al. | 280/707 |
| 4,825,370 | 4/1989 | Kurosawa | 364/424.05 |
| 4,923,038 | 5/1990 | Lizell | 188/299 |
| 4,992,190 | 2/1991 | Shtarkman | 252/62.52 |
| 5,062,657 | 11/1991 | Majeed | 280/707 |
| 5,162,996 | 11/1992 | Matsumoto et al. | 364/424.05 |
| 5,259,487 | 11/1993 | Petek | 188/267 |
| 5,276,622 | 1/1994 | Miller et al. | 364/424.05 |
| 5,276,623 | 1/1994 | Wolfe | 364/424.05 |

OTHER PUBLICATIONS

Rakheja et al., "Vibration and Shock Isolation Performance of a Semi–Active On/Off Damper," pp. 398–403 of the Transactions of the ASME, vol., Oct. 1985.

Karnopp, et al., "Vibration Control Using Semiactive Force Generators," ASME Paper No. 73–DET–123, May, 1974.

Guy, et al., "A Solenoid–Actuated Pilot Valve in a Semi–Active Damping System," SAE Paper No. 881139, Aug. 1988.

J. Alanoly et al., "A New Concept in Semi–Active Vibration Isolation," Transactions of the ASME, 109, 242, Jun., 1987.

R.S. Sharp et al., "Road Vehicle Suspension System Design—A Review," Vehicle System Dynamics 16, pp. 167–192 1987 (month is not available).

R.S. Sharp, "Performance and Design Considerations for Dissipative Semi–Active Suspension Systems for Automobiles," Proc. Instn. Mech. Engrs., 201 D2, pp. 149–153, 1987 (month is not available).

C. Yue et al., "Alternative Control Laws for Automotive Suspensions," Trans. ASME, 111, p. 286, Jun., 1989.

M. Lizell, *Dynamic Leveling for Ground Vehicles*, Doctoral Thesis, Royal Institute of Technology, Stockholm, Ch. 3, 1990 (month is not available).

Ivers et al., "Semi–Active Suspension Technology: An Evolutionary View," Adv. Autom. Techn. ASME, vol. 40, p. 327, 1991 (month is not available).

Petek et al., SAE Technical Paper Series 950586, "Demonstration of an Automotive Semi–Active Suspension Using Electroheological Fluid," Feb. 27, 1995.

Miller et al., "The Design and Development of a Semi–active Suspension for a Military Tank," Societyof Automotive Engineers publication 881133, 1988 (month is not available).

Miller et al., "The effect of hardware limitations on an on/off semi–active suspension," publication C442/88, Instn. Mech. Eng., 1988 (month is not available).

*Primary Examiner*—Tan Q. Nguyen
*Attorney, Agent, or Firm*—David M. Shold

[57] ABSTRACT

The relative motion and force between two interconnected elements can be controlled by a semi-active two-stage adjustable damper to maximize isolation between the elements, while minimizing the instances of the motion exceeding acceptable limits. An algorithm determines when to apply the high force state of the damper to provide excellent isolation from input vibration and shocks. The dampers and control algorithms are useful in primary vehicle suspension systems, cab mounts, seat mounts and engine mounts.

30 Claims, 15 Drawing Sheets

Algorithm 1

Figure 4: Algorithm I

Figure 5: Algorithm II

Figure 6: Algorithm III

Figure 7: Algorithm IV

Figure 8: Algorithm V

METHOD FOR CONTROLLING MOTION USING A TWO-STAGE ADJUSTABLE DAMPER

BACKGROUND OF THE INVENTION

The present invention relates to a method for controlling the relative motion and force between two interconnected elements to maximize isolation between the elements, while minimizing the instances of the motion exceeding acceptable limits. More specifically, it relates to a method for controlling a damper, that is adjustable between high damping and low damping, to achieve good isolation while reducing excessive motion in a suspended system.

Vibration isolation mounts, such as primary vehicle suspensions, engine mounts, truck cab suspensions and truck and bus seat suspensions, isolate a "sprung mass" from the object on which the mass is mounted (the "unsprung" mass). There are three general mount types: passive, semi-active and active. Passive mounts (engineered rubber mounts, springs with friction dampers, or, most commonly, springs with viscous drapers) are limited in performance due to compromises needed to achieve good control at the resonance frequency and good isolation at high frequencies. Active systems use sensors and control hardware and software to determine what forces are necessary to "cancel" the vibrations from the unsprung mass. These systems require a power source to provide the force needed for optimum control and isolation. Cost and performance limitations prevent active systems from being widely accepted. The semi-active systems also use sensors and control hardware and software to determine what actions are needed to achieve the desired control and isolation of the sprung mass. However, unlike the active systems, the semi-active suspensions do not use a power source for providing the control force. They use a controlled draper that can remove energy from the suspension system but cannot add energy to the system. Semi-active systems are a cost effect method for providing improved isolation relative to the passive systems without the high cost of the fully active systems. Semi-active systems can be divided into two categories. One type is a two-stage or "on/off" system which uses a damper with a low damping state and a high damping, state and a controller to select which damping state provides the best damping at a specific moment in time. The other type is referred to as a continuously variable system where the draping force of a draper is more closely matched to an "ideal" damping force calculated by a controller. To achieve the close match between damper force and calculated force, continuously variable semi-active systems either use dampers that have greater than two, and more desirably, a continuum of damping stages or use a controller and power source which provide a pulse width modulated signal to, typically, a two stage damper to approximate damping stages between the discrete stages. A control means including an algorithm for controlling for such a continuously variable dampers is described in detail in copending U.S. application Ser. No. 08/429,990, filed Apr. 27, 1995. The advantage of the continuously variable semi-active suspension system is improved performance relative to the two-stage system. However, the lower cost and system simplicity can make the two-stage system the preferred solution to improved isolation.

Several control algorithms have been proposed that use a high/low damping controllable damper to achieve good isolation between sprung and unsprung masses. One such control algorithm, which is referred to as the Sankar algorithm, selects the damper stage based on a calculation to counteract the force of the spring to limit the input force to the sprung mass. In particular, the Sankar algorithm places a damper in a zero or low damping state when the relative velocity and the relative displacement have the same direction, and places a damper in a high damping state when the relative velocity and the relative displacement have opposite direction. Another such control algorithm, which is referred to as the "skyhook" algorithm, selects the damper stage based on a calculation to perform as if the damping is not between the sprung mass and the unsprung mass but is instead between the sprung mass and an inertial reference frame, the "sky". The skyhook algorithm places a damper in a zero or low damping mode when the relative velocity and the estimated absolute velocity have the opposite direction, and places the damper in a high damping state when the relative velocity and estimated absolute velocity have the same direction. These two algorithms are described as control models by Rakheja and Sankar, "Vibration and Shock Isolation Performance of a Semi-Active "On/Off" Damper" pages 398–403 of the Transactions of the ASME, Vol. 107, October, 1985. An advantage of the Sankar algorithm is that only the relative displacement need be measured for the algorithm to be implemented. The skyhook requires two measurements to obtain the needed variables.

A limitation of these algorithms is that the low or "off" damping state is assumed to have zero damping and does not account for the viscous damping that occurs even in the low damping state. U.S. Pat. No. 5,062,657, Kamal N. Majeed, Nov. 5, 1991, discloses an improved "on/off" control algorithm which does not switch from the low damping to the high damping state until the required damping force calculated by the semi-active control exceeds a force threshold. This allows for a non-zero damping force in the low damping state.

Another limitation of the Sankar and skyhook algorithms is that both are susceptible to exceeding the limits of its stroke when the suspension is drive by large displacement inputs. In particular, Guy, et al., "A Solenoid-Actuated Pilot Valve in a Semi-Active Damping System," SAE Paper No. 881139, August 1988, teaches that a shortcoming of the most effective isolation semi-active control algorithms is that large velocity and displacement inputs into the suspension can consume all available suspension travel, resulting in suspension "Topping" or "Bottoming." This shortcoming must be overcome by using a) alternate algorithms that are less effective in isolating the sprung mass or b) control strategies that use the best vibration isolation algorithm when the probability of topping or bottoming is low, and use a separate algorithm, which acts to prevent the suspended mass from exceeding the stroke limits, when the probability of topping and bottoming is high. As an example, U.S. Pat. No. 4,468,050, Woods et al., Aug. 28, 1984, discloses a computer optimized adaptive suspension system. This reference describes the problems of "Topping Out" and "Bottoming Out," i.e., the condition where a bump or other influence on the chassis or wheel causes the axle to try to rise toward the chassis closer than it can physically. This can cause a severe jolt to the passengers and possibly damage the shock absorber or suspension. To avoid this, the control process independently increases compression damping as the axle approaches bottoming out and increases rebound damping as the axle approaches topping out. As another example, U.S. Pat. No. 5,276,622, Miller et al., Jan. 4, 1994, discloses a system for reducing suspension end-stop collisions, which provides an override control policy which alters the damper command signals as necessary to increase

3 the damping characteristics of the damper assembly at times when the isolation system is likely to meet or exceed the end stops in order to minimize the incidence of end-stop collisions.

SUMMARY OF THE INVENTION

The present invention provides a method for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements being situated within extreme limits of acceptable displacement therebetween of $x_{+limit}$ in a positively defined direction and $x_{-limit}$ in a negatively defined direction; said elements being provided with a means for applying a second force therebetween, opposed to the direction of the relative motion of the elements, which means can be switched between an "on" state characterized by a high force and an "off" state characterized by a low force, the difference between said high force and said low force being defined as the controlled force; said method comprising:

(a) measuring the displacement $x_{rel}$ of the second element relative to the first element, $x_{rel}$ being defined as zero at the equilibrium position;

(b) determining the relative velocity $v_{rel}$ of the two elements; and (c) applying the high force between the first and second elements if $$|v_{rel}| > v_{db} \text{ and } v_{rel}^2 > -\frac{2dF_{sys}}{m},$$

otherwise applying the low force;
where:

$v_{db}$ is a velocity deadband with a preselected value greater than or equal to zero, m is the effective mass of the second element, d is the distance from the displacement $x_{rel}$ to the acceptable extreme displacement limit $x_{+limit}$ or $x_{-limit}$ in the direction of the relative velocity $v_{rel}$, and $F_{sys}$ is the sum of the forces acting between the first and second elements other than the controlled force of the second force means;

whereby the force transmitted from the first element to the second element and the relative displacement between said elements are controlled.

In another embodiment, the present invention provides method, as before described, for controlling the relative motion between two elements wherein the high force is additionally applied if $v_{rel}F_{sys}>0$.

In another embodiment, the present invention provides a method, as first described, for controlling the relative motion between two elements further comprising measuring the absolute acceleration of the second element and calculating the absolute velocity $V_{abs}$ of the second element, and wherein the high force is additionally applied if $$v_{rel}v_{abs} > \frac{v_{rel}F_{sys}}{2\zeta\sqrt{km}};$$

where:
m is the effective mass of the second element,

4 k is the spring rate of the spring assembly at the relative displacement $x_{rel}$, and $\zeta$ is a number greater than 0 and less than or equal to 1.

In another embodiment the present invention provides a method for controlling the relative motion between two elements, as before described, comprising:

(a) measuring (i) the displacement $x_{rel}$ of the second element relative to the first element, $x_{rel}$ being defined as zero at the equilibrium position; and (ii) the absolute acceleration of the second element;

(b) calculating (i) the relative velocity $v_{rel}$ of the elements and (ii) the absolute velocity $v_{abs}$ of the second element; and (c) applying the high force between the first and second elements if $$|v_{rel}| > v_{db} \text{ and } v_{rel}v_{bs} > \frac{v_{rel}F_{sys}}{2\zeta\sqrt{km}},$$

otherwise applying the low force;

whereby the force transmitted and the relative displacement between said elements are controlled.

In another embodiment the present invention provides a method for controlling the relative motion between two elements, as before described, comprising:

(a) measuring the displacement $x_{rel}$ of the second element relative to the first element, $x_{rel}$ being defined as zero at the equilibrium position;

(b) determining the relative velocity $v_{rel}$ of the two elements; and (c) applying the high force between the first and second elements if $|v_{rel}|>v_{db}$ and $v_{rel}F_{sys}>0$, otherwise applying the low force;

whereby the force transmitted and the relative displacement between said elements are controlled.

The present invention further provides a device for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements having extreme limits of acceptable displacement therebetween of $x_{+limit}$ in a positively defined direction and $x_{-limit}$ in a negatively defined direction; said device comprising:

(A) a damper for applying a second force between said two movably interconnected elements, which damper can be switched between an "on" state characterized by a high force and an "off" state characterized by a low force, the difference between said high force and said low force being characterized as the controlled force; and (B) a controller adapted to send a control signal to said damper in response to the condition of the two movably interconnected elements, said control signal corresponding to the high force state or the low force state of said damper;

wherein the high force state is selected under any of the conditions as described above.

DETAILED DESCRIPTION OF THE INVENTION

Figure 1:
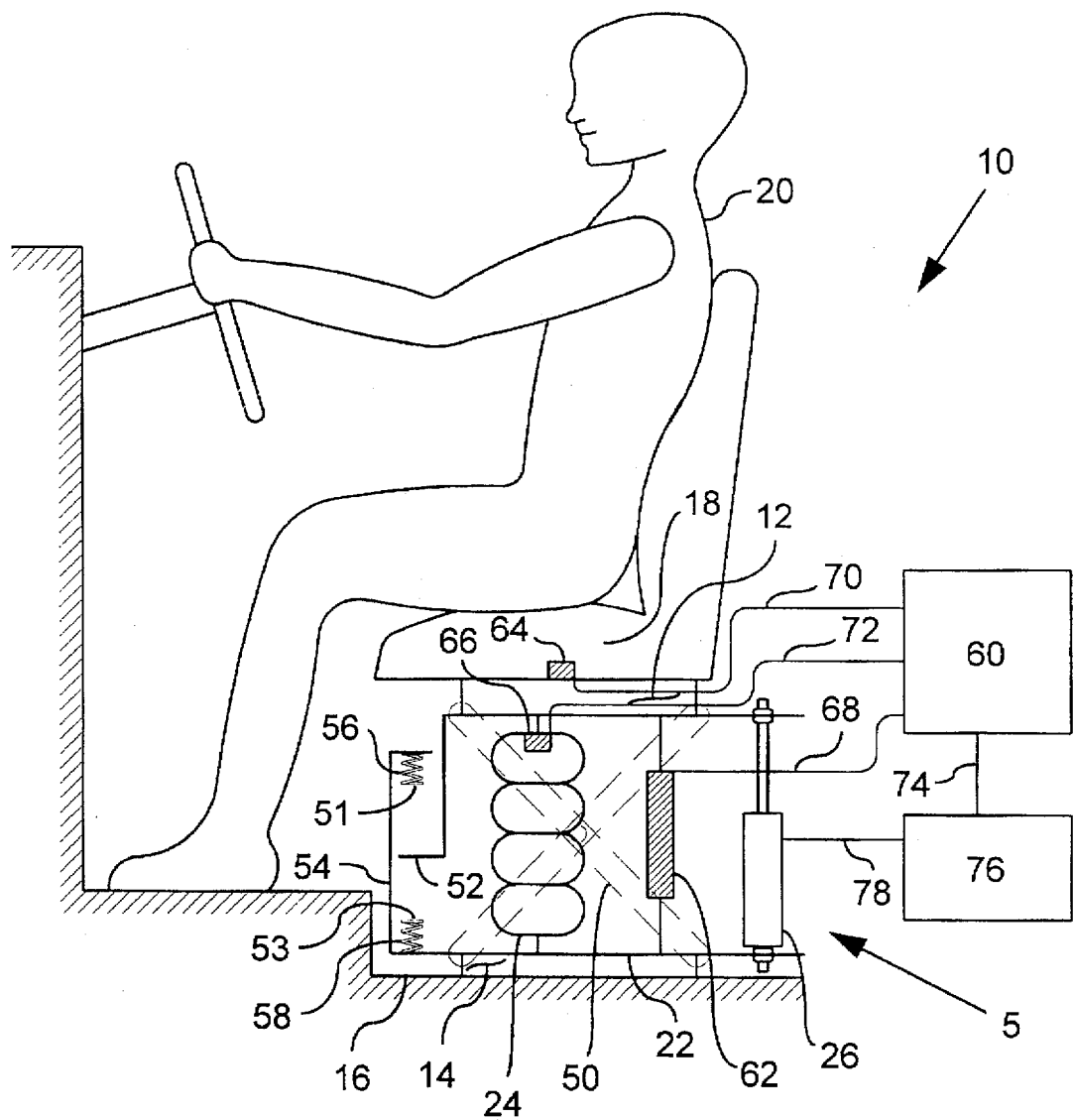
FIG. 1 is a representation of a device including a damping mechanism for a suspended mass.

FIG. 1 illustrates one embodiment of the present invention. Here reference number 10 designates a two-degree-of-freedom suspension system or similar force-isolating mounting system for controlling the relative motion between two elements. The system uses a suspension mechanism 5 to interconnect vertically-spaced and relatively movable supported (or "sprung") and supporting (or "unsprung") elements 12 and 14. By way of example, the elements 12 and 14 respectively are shown to be the sprung and unsprung mass elements of a suspended seat, suspended on, e.g., a vehicle cab or vehicle chassis. Alternatively, the system could represent a mounting and suspension system for a vehicle cab, an engine mount, the primary suspension system for a vehicle chassis, or any other system for which vibration isolation is required.

As illustrated, the sprung mass is a suspended seat carrying a human operator 20, mounted on a vehicle cab, 16, which is not shown in detail. A suspended seat of this type is typically used to isolate and protect an operator of a heavy on- or off-road vehicle. In particular, the sprung element 12 has mass "m" which, in the example illustrated, includes a contoured and cushioned seat 18, the portion of the mass of the operator 20 which is supported by the seat, and a portion of the mass of the suspension mechanism 5. The unsprung element 14 includes the base 22 used to attach the seat to the cab 16 and a portion of the mass of the suspension mechanism 5. In general, the cab 16 will be supported and isolated from a road or other surface by additional suspension components, not shown. However, such suspension elements are normally not sufficient to fully isolated the cab 16 from road surface irregularities or other vibration inputs. Hence, a primary function of the system 10 is to isolate the supported member 12 insofar as possible from vibratory or other forces transmitted through member 14.

The suspension mechanism 5 for the seat of FIG. 1 includes a mechanical linkage 50, an adjustable primary spring assembly 24, and a semi-active damper assembly 26. The mechanical linkage 50 confines the relative motion of the sprung and unsprung elements 12, 14 to the vertical axis, thus allowing only an up and down motion between the elements. It is to be understood that application of the present invention is not limited to vertical motion alone, and indeed variations of the system can be constructed which control motion in all three physical dimensions. However, for the sake of clarity, a device which controls motion along one axis only will be described in detail. Extension to additional dimensions can be accomplished by a person skilled in the art.

The mechanical linkage aligns the spring and damper 24 and 26 to apply force along the axis of motion. Incorporated within the mechanical linkage 50 are stops which limit the travel of the suspension mechanism 5 along the axis of movement. These stops are shown schematically as two interlocking members 52 and 54. The reference number 51 represents the extension ("rebound") stop of the mechanism 5 which is reached when elements 12 and 14 reach full extension. The reference number 53 represents the retraction ("jounce") stop of the suspension mechanism 5 which is reached when the members 12 and 14 are in a fully retracted or compressed position. Impact dampers 56 and 58, such as resilient, deformable elastomeric pads or the like are typically used as stops to cushion the impact when elements 12 and 14 reach the limits of the extension or retraction travel.

The primary spring assembly 24 of the suspension mechanism 5 can be any known type of spring assembly, including leaf springs, coil springs, air springs, and elastomeric components which function as springs. The spring assembly can be a separate element or it can be integrated into the damper assembly, as in the case of an engine mount, in which a deformable elastomeric component functions as a spring. In a preferred embodiment, as illustrated, it is an adjustable spring assembly, preferably an air-adjustable assembly, which allows the operator 20 to sit at an appropriate height for comfort, safety and operating efficiency. The characteristics of the primary spring assembly 24 are typically designed such that the natural frequency of the suspension system 10 is on the order of 1 Hz over the typical load range of the seat. The spring assembly 24, however, does not have to be linear in its response, nor does the natural frequency of the suspension system 10 need to be particularly well defined.

Figure 2:
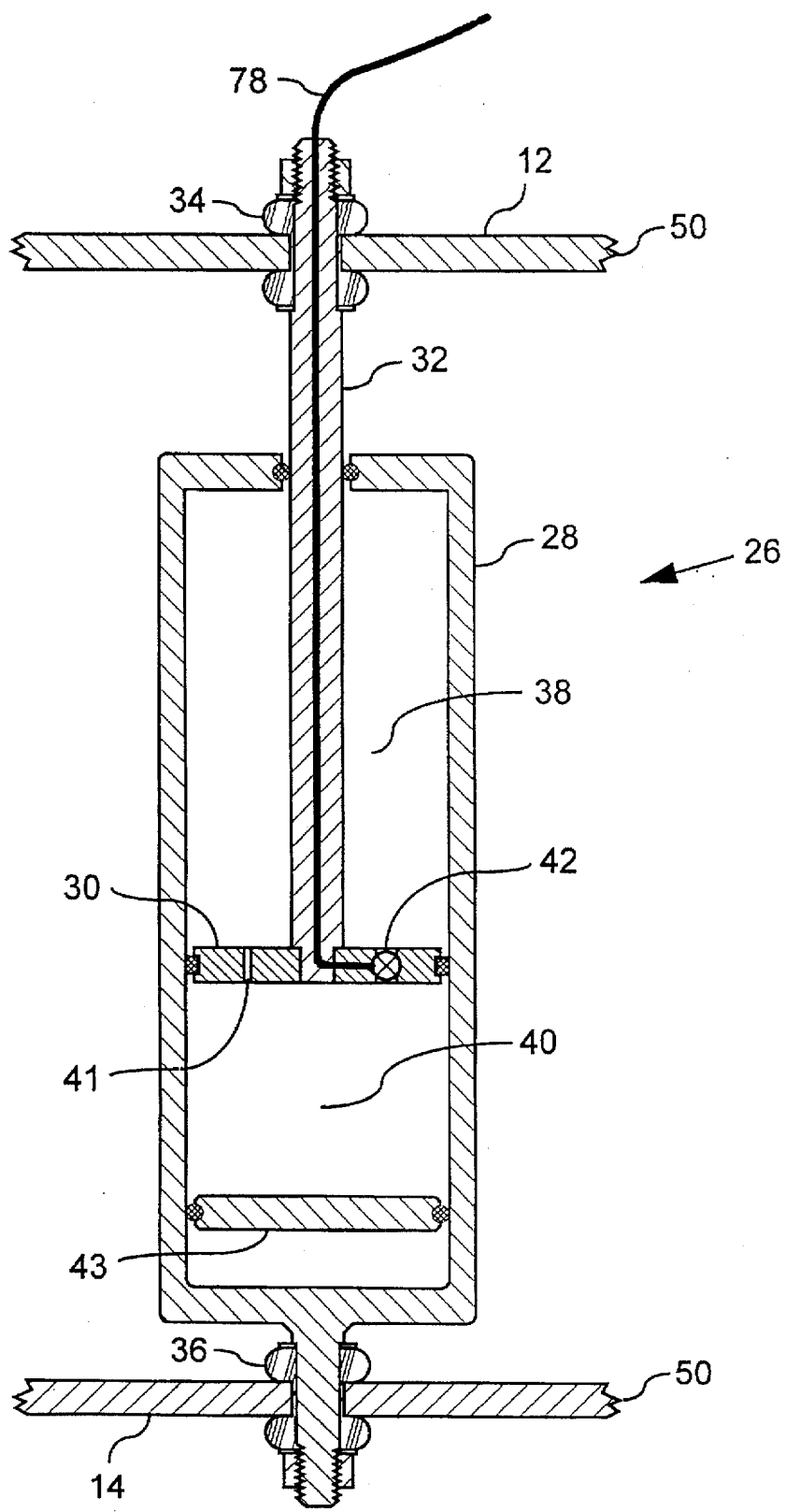
FIG. 2 shows in detail one embodiment of a semi-active damper assembly.

The damper assembly 26 of the suspension mechanism 5 can be of any suitable construction that allows switching between an high damped "on" state which results in an applied force "$F_{on}$" between sprung and unsprung elements 12 and 14, and a low damped "off" state which results in an applied force "$F_{off}$" between elements 12 and 14. A damper is a device characterized in that it applies force in a direction opposite to that of the applied motion. Typically, it is of the hydraulic piston and cylinder type, as illustrated in FIG. 2, having a hydraulic cylinder 28 enclosing a piston 30. Referring now to FIG. 2, a piston rod 32 is connected to the piston 30 and is secured to the upper portion of the mechanical linkage 50 by a suitable connector including, for example, a bushing 34 formed by elastomer or similar resilient, compliant material. The cylinder 28 is secured to the lower portion of the mechanical linkage 50 by a suitable connector which includes, for example, a deformable bushing 36, also formed of elastomer or similar resilient, compliant material. Relative vertical motion between elements 12 and 14 causes relative movement between the cylinder 28 and the piston 30. The ratio between the relative motion between elements 12 and 14 and the relative movement between the cylinder 28 and the piston need not be 1-to-1, and indeed need not be linear such that the ratio remains fixed over the entire range of relative movement between elements 12 and 14; although in practice, the mechanism 5 is generally design such that the ratio of relative movements are essentially fixed over the range of relative movement. Furthermore, the positioning of the damper assembly 26 need not be vertical as shown in FIG. 1.

The relative movement between cylinder 28 and piston 30, in FIG. 2, displaces a fluid (not shown) between the upper and lower variable volume fluid chambers 38 and 40 of the cylinder 28 via a flow paths 41 and 42. The flow path 42, which can be include within the piston 30 as illustrated, or be positioned separate from the piston, can be rapidly switched by electrical, mechanical, or other means, to alter the force required to cause movement in either an extending or retracting direction between the cylinder 28 and the piston 30. The optional flow path 41 (the presence of which is preferred but not essential) is parallel to flow path 42, and is a fixed viscous damping passage. Flow path 41 can be used to tune the damping characteristics of the damper when the relative velocity between the cylinder 28 and the piston 30 is low, or when flow path 42 is severely restricted. A means, such as floating piston 43, can be provided to allow for expansion and displacement of the fluid.

The force required to cause relative displacement of the cylinder 28 within the piston 30 is rapidly switched in a controlled manner from a low damping force "off" state to a high damping force "on" state. The damping force of the "on" state in excess of the damping force of the "off" state is the force that can be controlled by switching flow path 42. Switching flow path 42 results in a controlled damping force "$F_{control}$" between the sprung and unsprung elements 12 and 14 which is the applied force $F_{on}$ in excess of the applied force $F_{off}$; $F_{control}=F_{on}-F_{off}$. In the damper illustrated, the damping force of the "off" damping state is not zero due to the viscous character of the fluid within the damper. Depending on the switching mechanism contained in flow path 42, the controlled force can be a function of the relative velocity between the cylinder 28 and piston 30, or can be generated essentially independently of the relative velocity of the damper elements. U.S. Pat. No. 4,770,438, Fukashi, et. al., Sep. 13, 1988, and U.S. Pat. No. 4,984,819, Shinobu, et al., Jan. 15, 1991, describe dampers that would be appropriate for this application.

The damper assembly 26 need not be of the hydraulic piston and cylinder type. For example, the damper assembly 26 can be of the rotary type described in U.S. Pat. No. 4,992,190, Shtarkman (see "Example" in col. 60), and can be incorporated into the suspension mechanism 5 in such a manner that $F_{control}$ can be rapidly switched.

A controller 60, shown schematically in FIG. 1 and discussed in detail below, produces a control signal for controlling the flow path 42 of the damper assembly 26 in order to rapidly select whether the force $F_{on}$ or the force $F_{off}$ is applied between elements 12 and 14 by the damper. As illustrated in FIG. 1, the force generated by the damper assembly 26 is the same as the force applied between elements 12 and 14; however, it is understood that the ratio of the force generated at the damper assembly 26 and the force applied between elements 12 and 14 is affected by the lever ratios designed for the seat mechanism 5 and the positioning of damper assembly 26 within the mechanism, and thus these forces need not be the same. The forces $F_{on}$ and $F_{off}$ however, refers to the forces due to the damper assembly 26, in the "on" state and the "off" state respectively, that is actually applied between elements 12 and 14. The damping state of the damper assembly 26 is determined by the control policies of the present invention based on the instantaneous motion of the supported element 12 relative to the unsupported element 14.

Various parameters are employed for calculating if the damper assembly 26 should be in the "off" state or the "on" state. The designations "$x_{rel}$" and "$v_{rel}$" respectively designate the relative vertical displacement and the relative vertical velocity between the supported element 12 and the unsupported element 14. By convention, a positive value of these state variables indicates an upward direction of the supported element 12, away from the unsupported element 14, and a negative value a downward direction. The term "$v_{abs}$" designates the absolute vertical velocity of the supported element 12. Consistent with the usage above, a positive value of this state variable indicates an upward direction and a negative value a downward direction.

The time-averaged equilibrium position of the suspension mechanism 5 is defined to be zero. Due to friction in the suspension mechanism 5, the time-average equilibrium position may not be the same as the static or rest position, since friction can prevent the mechanism from returning to the true, time-average equilibrium position. In particular, a rest position can depend on whether the return to equilibrium is from the positive direction or the negative direction, on the velocity of the system as it approaches equilibrium, and other variables. Therefore, the time-averaged equilibrium provides the best estimate of the true equilibrium. The distance from this equilibrium position to the extension stop 51 is defined as $x_{rel}=x_{+limit}$ and the distance from the equilibrium position to the retraction stop 53 is defined as $x_{rel}=x_{-limit}$. In suspension system 10 the height of suspension mechanism 5 is optionally adjustable to allow for operator comfort, safety and operating efficiency, the equilibrium position being selected by the operator. In suspension systems without an adjustable height control, the equilibrium position is affected by the mass of the operator. Thus, while the actual equilibrium position is not the same for all operators, the equilibrium position for each operator will always be defined as $x_{rel}$ equal zero, and $x_{+limit}$ and $x_{-limit}$ will vary accordingly. Similarly, the operator may desire to adjust the stroke limit of the suspension mechanism 5 to limit the distance from the operator's arms and legs to the vehicle operating controls. Hence, while $x_{rel}$ can normally vary from the extension stop 51 to the rebound stop 53, the operator might wish to limit the stroke to a lesser range. Therefore in one embodiment, a feature is included in the suspension system 10 to allow the operator to independently set the displacement limits $x_{+limit}$ and $x_{-limit}$ relative to the equilibrium position of $x_{rel}$, as long as those limits are within the maximum displacements allowed by the stops 51 and 53. In the present illustration, however, the displacement limits are determined by the mechanical stops 51 and 53. In a more general sense, $x_{+limit}$ and $x_{-limit}$ represent acceptable displacement limits, regardless of their origin or nature.

A controller 60 receives input data from motion sensors 62 and 64 associated with the elements 12 and 14, and, in this illustration, from a pressure sensor 66 associated with an air spring assembly 24. Sensor 62 directly detects the instantaneous relative displacement $x_{rel}$ of elements 12 and 14. Sensor 64 detects the instantaneous absolute acceleration $a_{abs}$ of element 12. Sensor 66 detects the time averaged pressure in the air spring of the spring assembly 24, which is a function of the mass m of the sprung element 12. Data from sensors 62, 64 and 66 are sent via lines 68, 70 and 72 to the controller 60. Those data are used by the controller 60 to calculate a signal which is sent via line 74 to a power source 76. The power source 76 then generates the appropriate control signal which is sent via line 78 to the damper assembly 26 to rapidly select either the "on" or the "off" state. It is noted that the signals referred to herein will typically be electrical signals, but they can be in principle any sort of signals capable of conveying information from one component of the system to another, including pneumatic, optical, magnetic, or mechanical signals.

Figure 3:
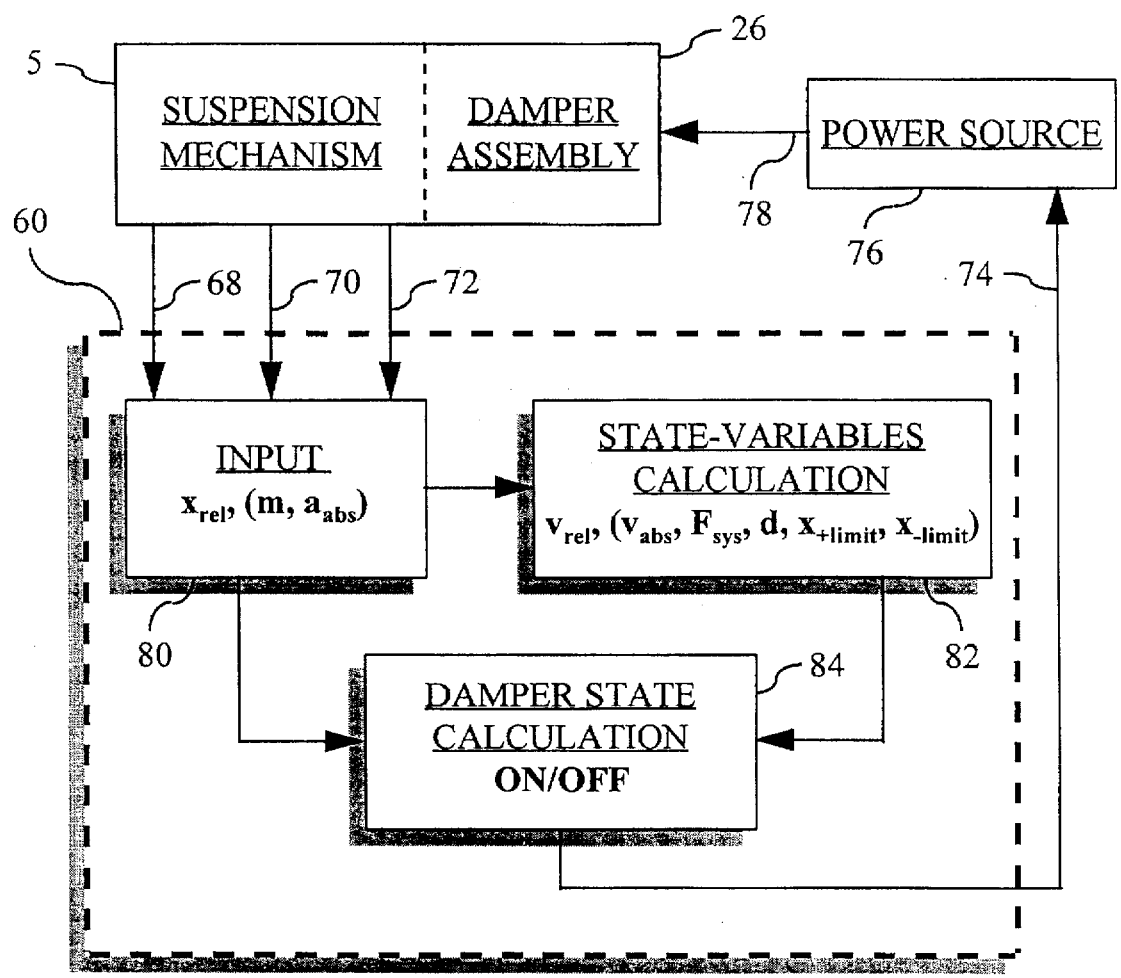
FIG. 3 shows a functional block diagram of the suspension system of FIG. 1 showing details of a controller of the present invention.

Referring now to FIG. 3, there is shown a functional block diagram of the suspension system with controller 60. The controller 60 has an input block 80, a state-variables calculation block 82, and a damper state calculation block 84. Each of these will now be described in greater detail.

The input block 80 receives the sensor data via lines 68, 70 and 72, and converts these signals to values for the following state variables: time averaged equilibrium position and the instantaneous relative displacement $x_{rel}$, and, if needed for subsequent calculations in the state variables calculation block 82, time average mass m of the sprung element 12, and instantaneous absolute acceleration $a_{abs}$ of the sprung element 12.

The state-variables calculation block 82 differentiates the relative displacement $x_{rel}$ signals to obtain the instantaneous relative velocity $v_{rel}$ and, if required in the damper state calculation block 84, calculates the displacement limits $x_{+limit}$ or $x_{-limit}$ or the distance "d" from the relative displacement $x_{rel}$ to the displacement limit $x_{+limit}$ or $x_{-limit}$ in the direction of the relative velocity $v_{rel}$. That is, if $v_{rel}$ is positive, then d equals $x_{+limit}$ minus $x_{rel}$, and if $v_{rel}$ is negative then d equals $x_{-limit}$ minus $x_{rel}$. Also, if required in block 84, the state variable calculation block 82 integrates the absolute acceleration $a_{abs}$ to obtain the absolute velocity $v_{abs}$ and calculates the system force $F_{sys}$.

As is well known to those skilled in the art, the differentiation function can be performed using a second order bandpass filter with a corner frequency of at least about 10 times the highest frequency of interest. Similarly, as is well known to those skilled in the art, integration can be performed using a second order bandpass filter with a corner frequency of at most about 0.1 times the lowest frequency of interest. Using this method of integration eliminates concern about the constant term of the absolute velocity $v_{abs}$, since the 0 Hz velocity is set to zero. That is, it is well known that the concept "absolute velocity" is used throughout this field of art, as a term of art, to indicate the results obtained by integration of the absolute acceleration of a body. The use of a second-order bypass filter with an appropriately selected corner frequency will provide a so-called, or estimated, absolute velocity which is in fact a velocity relative to the average uniform motion of the body in the recent past.

Either analog or digital filters can be used when performing the differentiation function. Digital filters are preferred due to their performance stability. For further information on digital filters, their use in differentiation and in integration to estimate absolute velocity, attention is directed to Miller et al., "The Design and Development of a Semi-Active Suspension for a Military Tank," paper 881133, Society of Automotive Engineers, Inc., 1988, pages 1–9, particularly pages 6–7, and Miller, "The Effects of Hardware Limitations on an ON/OFF Semi-Active Suspension," paper C442/88, I Mech. E., 1988, pages 199–205, particularly 202–203.

When selecting a frequency range for optimally controlling the suspension system, one might be inclined to choose the range as wide as possible in an attempt to provide maximum performance. However, due to resolution and processing time constraints of present-technology digital processors, especially when using filters for performing the differentiation and integration functions, and due to the response time constraints of other elements of the suspension system, the range should generally be selected conservatively. For a suspended seat application, the frequency range for optimal control is typically chosen to be from the resonant frequency of the suspension system, on the order of 1 Hz, up to a frequency of approximately 20 Hz. In general, for a suspended seat, even a "less-than-optimally controlled" suspension mechanism 5 and, in particular, the cushioned seat 18 can provide a measure of isolation for inputs of greater than 20 Hz, which may be adequate. Hence, in this application the lowest frequency of interest is generally 1 Hz; thus causing the corner frequency for integrating the absolute acceleration $a_{abs}$ data to obtain the instantaneous absolute velocity $v_{abs}$ to be at most 0.1 Hz. The highest frequency of interest is generally 20 Hz, thus causing the corner frequency for differentiating the relative displacement $x_{rel}$ data to obtain the instantaneous relative velocity $v_{rel}$ to be at least 200 Hz.

If needed, the state variables calculation block 82 of the controller 60 calculates all forces $F_{sys}$ which are applied between elements 12 and 14 by the suspension mechanism 5 other than the controllable applied force $F_{control}$ and that portion of the spring force which maintains the elements 12, 14 at the equilibrium position in response to the force of gravity. Included within the system force is the variation of the spring force of the primary spring assembly 24 when the spring assembly is deflected from the equilibrium position, the $F_{off}$ applied by the semi-active damper assembly 26, the frictional force generated by the mechanical linkage 50, and any additional forces due to elastomeric bushings within the suspension mechanism. The additional forces, for example, could include forces due to the jounce or rebound impact dampers 56 or 58 should the relative displacement $x_{rel}$ be sufficiently great to allow contact with either damper 56 or 58.

Let us now consider the likely or common values for the components of the system force $F_{sys}$. The variation in primary spring force between elements 12 and 14 from the equilibrium position is $-x_{rel}$ times the spring rate "k" due to the spring assembly 24 at the displacement $x_{rel}$. Since, in general, the ratio between relative movement between elements 12 and 14 is essentially a constant, and since the air spring illustrated is a relatively linear spring, k, in this case, can be approximated as a constant equal to the spring rate at the equilibrium position. Secondly, the variation in the "off" damping force between elements 12 and 14 is $-v_{rel}$ times the damping parameter "C" due to the damper assembly 26 at the displacement $x_{rel}$. Since, in general, the ratio between relative movement of damper assembly 26 and the relative movement between elements 12 and 14 is essentially a constant, C, in this case can be approximated as a constant that can depend on the performance character of damper assembly 26 or can be tuned to optimize the calculated $F_{sys}$. Finally, the friction force of the suspension mechanism is typically a velocity-independent constant in the direction opposite the relative velocity $v_{rel}$ when the velocity is not equal to zero, and is another, usually larger, constant when the relative velocity $v_{rel}$ equals zero. That is, the friction force equals $-F_{dynamic}$ times the sign of the relative velocity $\text{sgn}(v_{rel})$ when $v_{rel}$ is not zero and equals $-F_{static}$ times the sign of any opposing force when $v_{rel}$ is zero. (The magnitude of the static friction force $F_{static}$, however, can never be greater than the opposing force.) Another way of considering the friction force is, as previously described, that the friction force can cause the rest position of the seat suspension system 10 to be other than the zero-friction equilibrium position of the seat suspension. In particular, the friction force permits a range of possible rest positions of the seat. This range of rest positions can be thought of as a displacement deadband "$\pm x_{db}$" about the equilibrium position. An approximation of the friction force can be included with the approximated spring force such that the combined force is $-kx'$ where x' is the relative displacement of elements 12 and 14 in excess of a displacement deadband $X_{db}$, with value zero or greater. In this formulation, x' equals zero if the absolute value of the relative displacement $|x_{rel}|$ is less than or equal to the displacement deadband $X_{db}$, where x' equals $x_{rel}$ minus $x_{db}$ if the absolute value of the relative displacement $|x_{rel}|$ is greater than the displacement deadband $x_{db}$ and $x_{rel}$ is positive, or where x' equals $x_{rel}$ plus $x_{db}$ if the absolute value of the relative displacement $|x_{rel}|$ is greater than the displacement deadband $x_{db}$ and $x_{rel}$ is negative. The other internal forces of the suspension system 10 are in this case considered insignificant since the jounce and rebound impact dampers 56, 58 are generally not contacted within the selected displacement limits $x\_limit$, $x_{+limit}$. Therefore, for seat suspension 10 the uncontrolled system force $F_{sys}$ is approximated by $F_{sys}=-kx'-Cv_{rel}$ where k, x', and C are defined above. It is understood that other approximations of the system force $F_{sys}$ can be made. It is further understood that sensors, other than those shown in FIG. 1 can be used to obtain values for the internal forces of the suspension system.

The outputs of the input block 80 and the state variables calculation block 82 of the controller 60 are the state variables of the system. These variables are the time-averaged equilibrium position, the instantaneous relative displacement $x_{rel}$ and the instantaneous relative velocity $v_{rel}$ of elements 12, 14. Also if required in the damper state calculation block 84, the state variables can include the time average mass m of sprung element 12, the displacement limits $x_{+limit}$ or $X_{-limit}$ or the instantaneous distance d to the displacement limit in the direction of $v_{rel}$, the instantaneous absolute velocity $v_{abs}$, and the system force $F_{sys}$. It is to be understood that these data can also be produced or derived from data from other sensors or other types of sensors or inputs than those shown in FIG. 1 and can be derived using other differentiation means than those described above. It is further understood that sensors, other that those shown in FIG. 1, can be used to obtain values for the internal forces of the suspension system.

The damper state calculation block 84 of the controller 60 in FIG. 3 uses the state variables obtained by block 80 and calculated in block 82 to determine if the semi-active damper assembly 26 should be in the "on" or the "off" state. The control algorithms used to provide improved control and isolation of the sprung element 12, which includes operator 20, will subsequently be described in detail. The output of block 84 is a (normally) electrical signal corresponding to the required "on" or "off" state of the damper, that is sent to power source 76 which in turn generates the appropriate signal to achieve the required "on" or "off" state of the damper assembly 26.

The damper state calculation block 84 functions by means of one or more control algorithms programmed thereinto, to provide the improved control and isolation of the sprung mass for relative displacements $x_{rel}$ within the displacement limits $x_{+limit}$ and $x_{-limit}$. General characteristics of each of the control algorithms to be described are that: 1) each requires the input of certain system state variables, and 2) each requires that when the absolute value of the relative velocity $|v_{rel}|$ is less than a preselected velocity deadband "$v_{db}$", the "off" state of damper assembly 26 is selected. The purpose for a velocity deadband $v_{db}$ is primarily to minimize any perceived "harshness" of the system. That is, while each of the algorithms subsequently described requires that the damper assembly 26 be in the "off" state when the relative velocity $v_{rel}$ is zero, response time limitations of the damper assembly 26 and in the calculation speed may lead to a delay in determining $v_{rel}$ or in selecting the damping state of the damper. If this happens, there could be a non-zero controlled force $F_{control}$ at the point when the relative velocity $v_{rel}$ changes direction. This phenomenon could introduce unacceptable friction-like harshness into the suspension system 10. Hence, a velocity deadband $v_{db}$ can be used to minimize the effects of such time delays on the suspension system and to minimize harshness.

Figure 4:
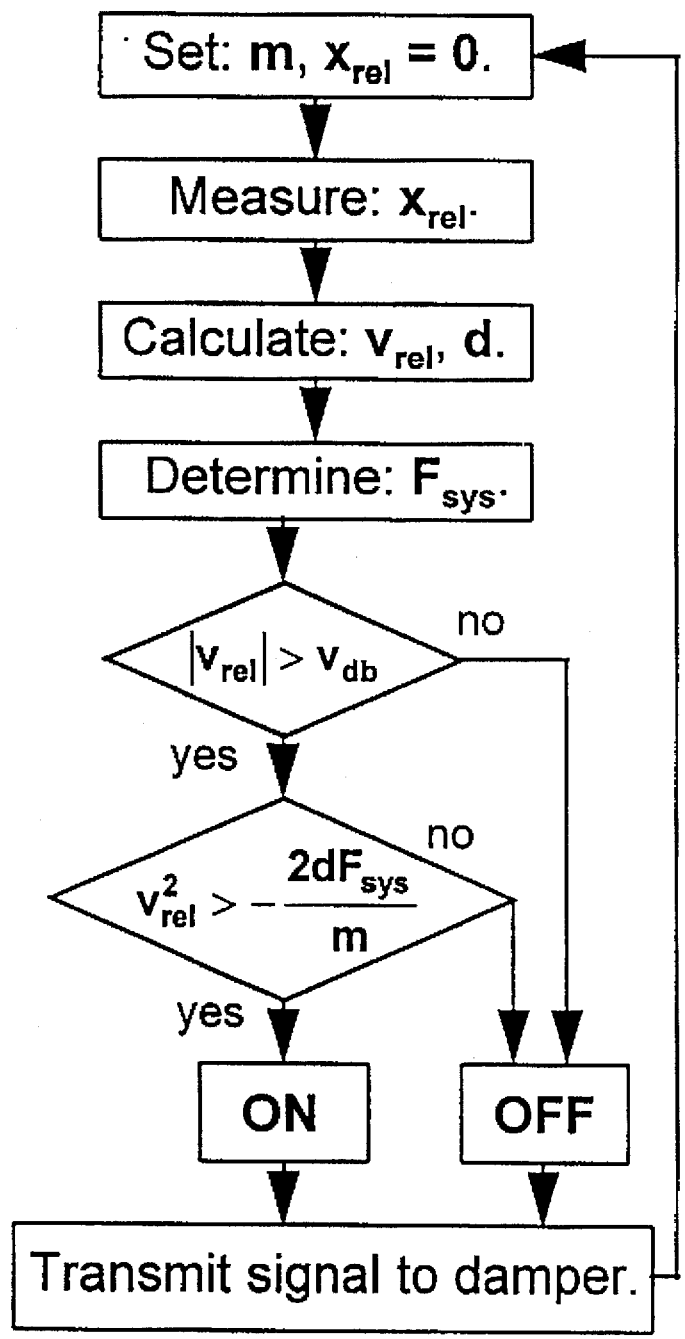
FIGS. 4 through 8 are block diagrams of controller and control algorithms suitable for the present invention.

FIG. 4 shows a block diagram of the controller containing a first algorithm (I) for controlling the relative motion between sprung and unsprung elements 12 and 14 of FIG. 1. This algorithm is designed primarily to avoid large displacements, in which $x_{rel}$ exceeds $x_{+limit}$ or $x_{-limit}$. As described in the input, state-variables calculation, and damper force calculation blocks of FIG. 3, the control process begins by setting the mass m and the equilibrium position of the relative displacement $x_{rel}$, to the time-averaged values obtained from the pressure sensor and the displacement sensor data. The instantaneous relative displacement $x_{rel}$ is measured, the instantaneous relative velocity $v_{rel}$ and the acceptable extreme displacement d in the direction of relative velocity $v_{rel}$ are calculated, and the instantaneous system force $F_{sys}$ is determined. These are the data employed by the algorithm.

The algorithm determines if the absolute value of the relative velocity $|v_{rel}|$ is greater than a preselected velocity deadband $v_{db}$ and if $$v_{rel}^2 > -\frac{2dF_{sys}}{m}.$$

The high force "on" state of damper assembly 26 is selected only if the determination is "yes". The appropriate electrical signal is sent to the power source 76 for damper assembly 26. Once the electrical signal is transmitted to the power source 76 for conversion to the control signal for the damper, the control process repeats.

Figure 5:
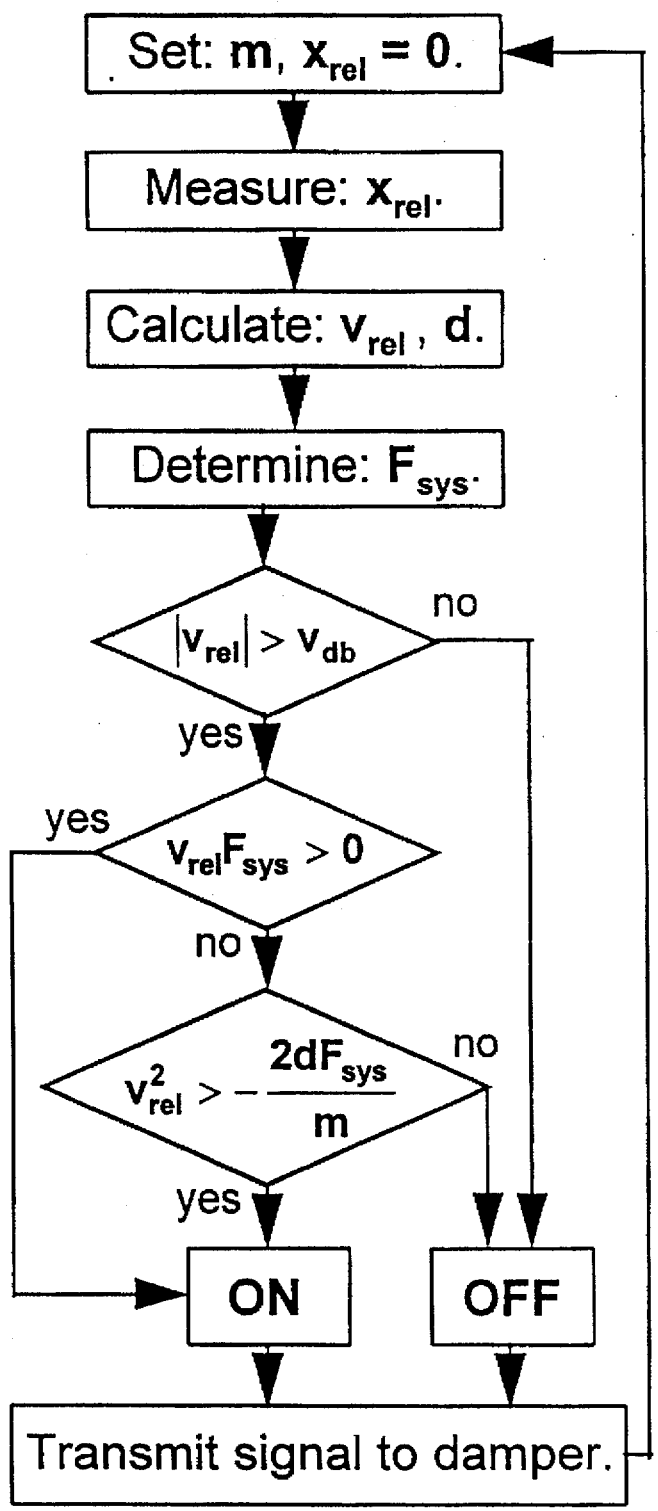

FIG. 5 shows a block diagram of the controller containing a second algorithm (II) for controlling the relative motion between sprung and unsprung elements 12 and 14 of FIG. 1. This algorithm is designed to provide improved ride and to avoid relative displacements $x_{rel}$ exceeding the displacement limits $x_{+limit}$ or $x_{-limit}$. The control process begins by setting the mass m and the equilibrium position of the relative displacement $x_{rel}$ to the time-averaged values obtained from the pressure sensor and the displacement sensor data. The instantaneous relative displacement $x_{rel}$ is measured, the instantaneous relative velocity $v_{rel}$ and the instantaneous distance to the acceptable extreme displacement d in the direction of relative velocity $v_{rel}$, are calculated, and the instantaneous system force $F_{sys}$ is determined. These are the data employed by the algorithm.

The algorithm determines if the absolute value of the relative velocity $|v_{rel}|$ is greater than a preselected velocity deadband $v_{db}$ and if $$v_{rel}^2 > -\frac{2dF_{sys}}{m}$$

or $v_{rel}F_{sys}>0$. The high force "on" state of damper assembly 26 is selected only if the determination is "yes". The appropriate electrical signal is sent to the power source 76 for damper assembly 26. Once the electrical signal is transmitted to the power source 76 for conversion to the control signal for the damper, the control process repeats.

Thus the second algorithm can be seen as a variation of algorithm (I) in which the "on" state is additionally selected when $v_{rel}F_{sys}>0$.

Figure 6:
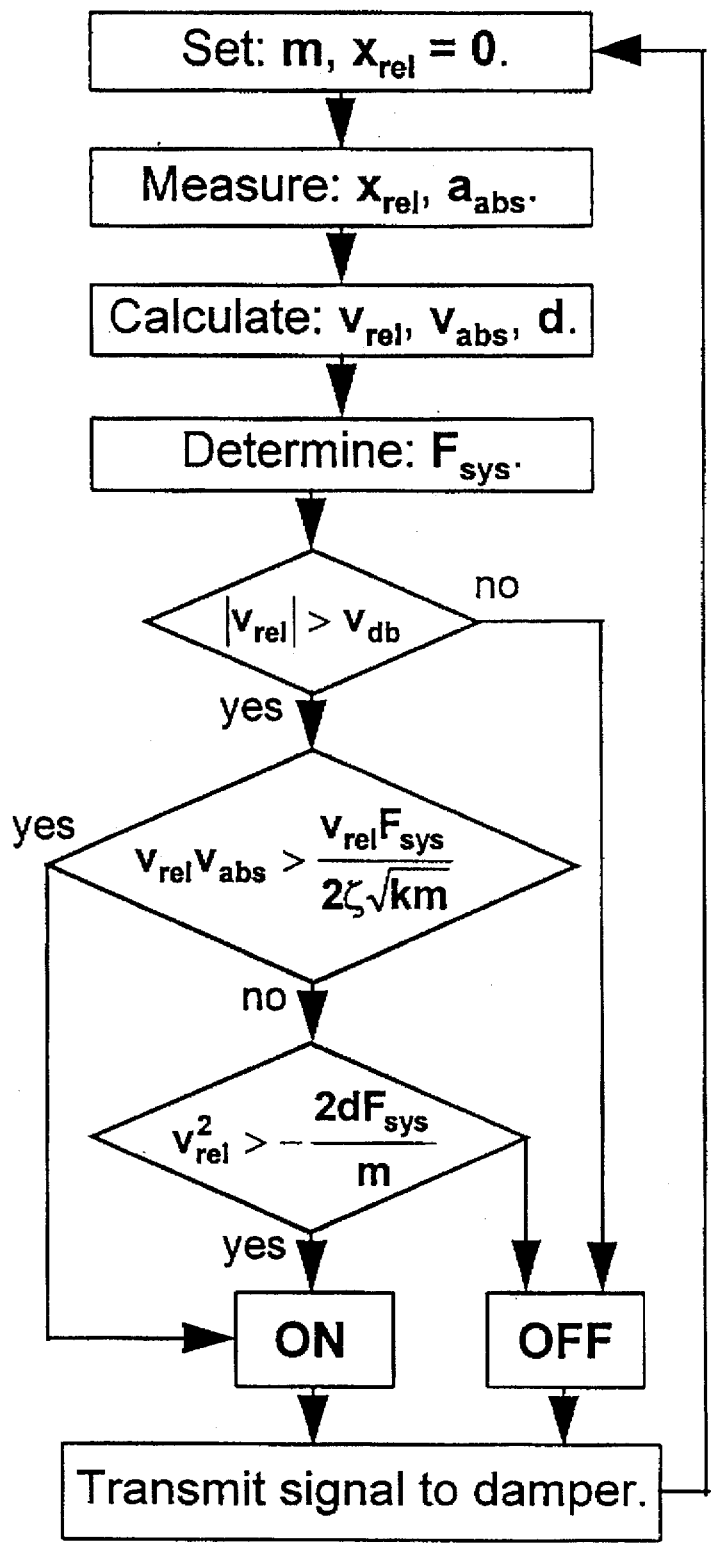

FIG. 6 shows a block diagram of the controller containing a third algorithm (III) for controlling the relative motion between sprung and unsprung elements 12 and 14 of FIG. 1. This algorithm is designed to provide improved ride and to avoid relative displacements $x_{rel}$ exceeding the displacement limits $x_{+limit}$ or $x_{-limit}$. The control process begins by setting the mass m and the equilibrium position of the relative displacement $x_{rel}$ to the time-averaged values obtained from the pressure sensor and the displacement sensor data. The instantaneous relative displacement $x_{rel}$ and the absolute acceleration $a_{abs}$ of element 12 are measured, the instantaneous relative velocity $v_{rel}$, the instantaneous absolute velocity $v_{abs}$ and the acceptable extreme displacement d in the direction of relative velocity $v_{rel}$ are calculated, and the instantaneous system force $F_{sys}$ is determined. These are the data employed by the algorithm.

The algorithm determines if the absolute value of the relative velocity $|v_{rel}|$ is greater than a preselected velocity deadband $v_{db}$ and if $$v_{rel}^2 > -\frac{2dF_{sys}}{m} \text{ or } v_{rel}v_{abs} > \frac{v_{rel}F_{sys}}{2\zeta\sqrt{km}},$$

where k is the spring rate between elements 12 and 14 due to the spring assembly 24 at displacement $x_{rel}$, and $\zeta$ is a number greater than 0 and less than or equal 1. The high force "on" state of damper assembly 26 is selected only if the determination is "yes". The appropriate electrical signal is sent to the power source 76 for damper assembly 26. Once the electrical signal is transmitted to the power source 76 for conversion to the control signal for the damper, the control process repeats.

Thus the third algorithm can be seen as a variation of algorithm (I) in which the "on" state is additionally selected when $$v_{rel}v_{abs} > \frac{v_{rel}F_{sys}}{2\zeta\sqrt{km}}.$$

Figure 7:
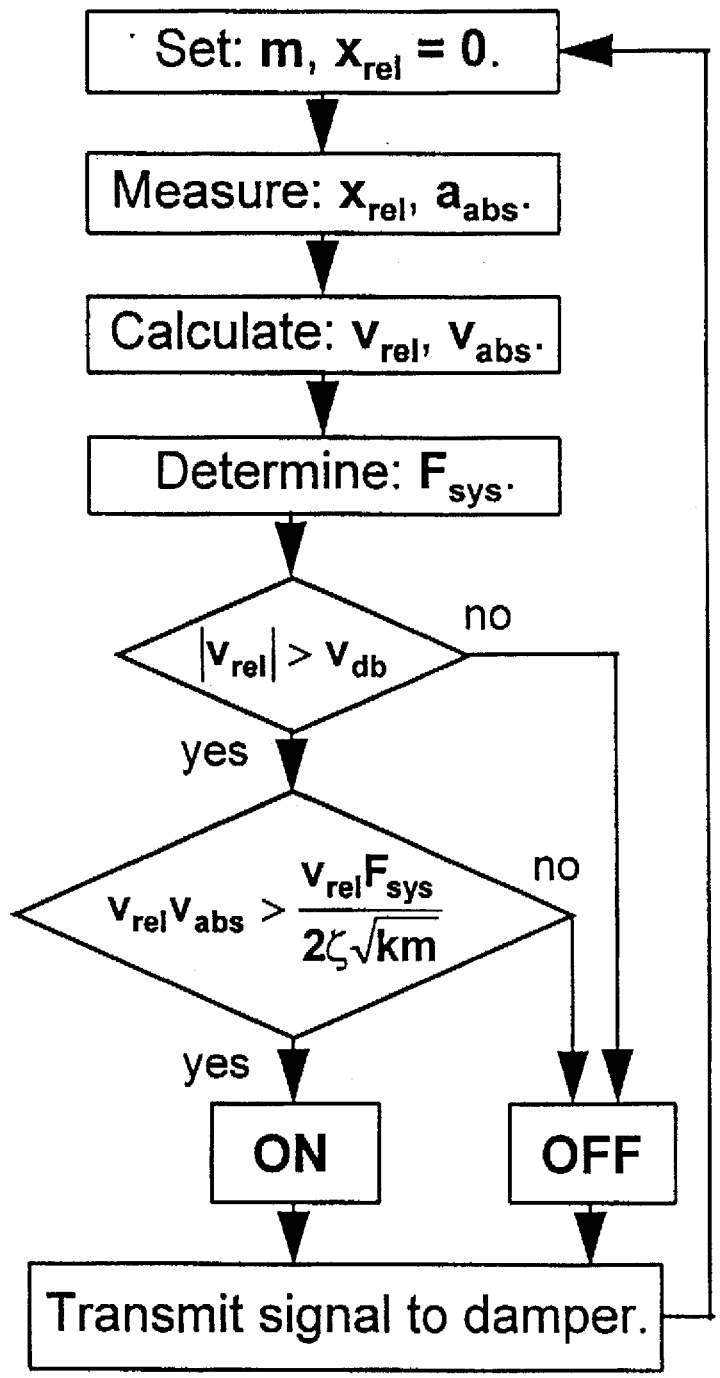

FIG. 7 shows a block diagram of the controller containing a fourth algorithm (IV) for controlling the relative motion between sprung and unsprung elements 12 and 14 of FIG. 1. This algorithm is designed principally for improved ride. The control process begins by setting the mass m and the equilibrium position of the relative displacement $x_{rel}$, to the time-averaged values obtained from the pressure sensor and the displacement sensor data. The instantaneous relative displacement $x_{rel}$ and the absolute acceleration $a_{abs}$ of element 12 are measured, the instantaneous relative velocity $v_{rel}$ and the instantaneous absolute velocity $v_{abs}$ are calculated, and the instantaneous system force $F_{sys}$ is determined. These are the data employed by the algorithm.

The algorithm determines if the absolute value of the relative velocity $|v_{rel}|$ is greater than a preselected velocity deadband $v_{db}$ and if $$v_{rel}v_{abs} > \frac{v_{rel}F_{sys}}{2\zeta\sqrt{km}},$$

where k is the spring rate between elements 12 and 14 due to the spring assembly 24 at displacement $x_{rel}$, and $\zeta$ is a number greater than 0 and less than or equal 1. The high force "on" state of damper assembly 26 is selected only if the determination is "yes". The appropriate electrical signal is sent to the power source 76 for damper assembly 26. Once the electrical signal is transmitted to the power source 76 for conversion to the control signal for the damper, the control process repeats.

Thus the fourth algorithm can be seen as a variation of algorithm (III) without the provision that the "on" state is selected when $$v_{rel}^2 > -\frac{2dF_{sys}}{m}.$$

Figure 8:
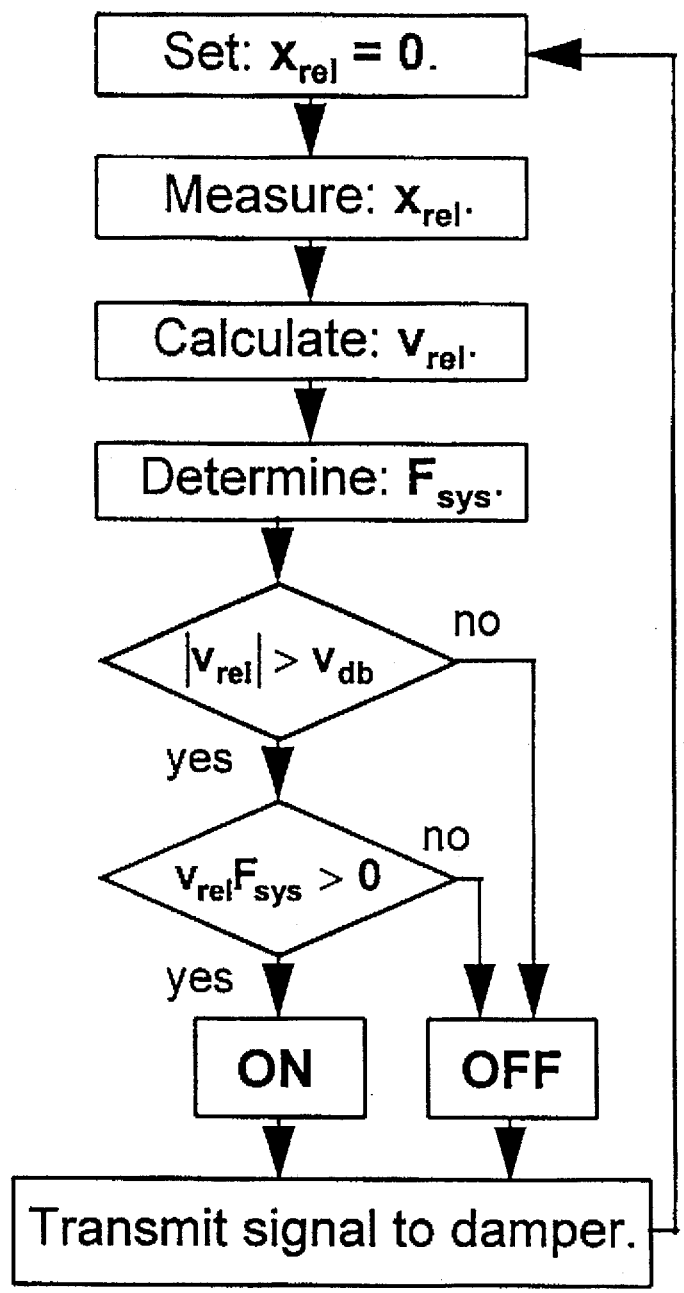

FIG. 8 shows a block diagram of the controller containing a fifth algorithm (V) for controlling the relative motion between sprung and unsprung elements 12 and 14 of FIG. 1. This algorithm is also designed principally for improved ride. The control process begins by setting the equilibrium position of the relative displacement $x_{rel}$ to the time-averaged value obtained from the displacement sensor data. The instantaneous relative displacement $x_{rel}$ is measured, the instantaneous relative velocity $v_{rel}$ is calculated, and the instantaneous system force $F_{sys}$ is determined. These are the data employed by the algorithm.

The algorithm determines if the absolute value of the relative velocity $|v_{rel}|$ is greater than a preselected velocity deadband $v_{db}$, and if $v_{rel}F_{sys}>0$. The high force "on" state of damper assembly 26 is selected only if the determination is "yes". The appropriate electrical signal is sent to the power source 76 for damper assembly 26. Once the electrical signal is transmitted to the power source 76 for conversion to the control signal for the damper, the control process repeats.

Thus the fifth algorithm can be seen as a variation of algorithm (II) without the provision that the "on" state is selected when $$v_{rel}^2 > -\frac{2dF_{sys}}{m}.$$

The scope of the invention described in algorithms I, II, III, IV, and V is principally intended for relative displacements $x_{rel}$ of elements 12 and 14 within the displacement limits $x_{+limit}$ and $x_{-limit}$, so as to provide isolation while maintaining these relative displacement within the limits. In some cases, however, the relative displacement $x_{rel}$ can extend beyond the limits $x_{+limit}$ and $x_{-limit}$. If there are large inputs to the supporting element 14, and the limits $x_{+limit}$ and $x_{-limit}$ are set less than the mechanical stops 51 and 53, or the impact dampers 56 and 58 are sufficiently deformable, significant travel of the mechanical linkage 50 beyond the limits can occur. It is understood that under these conditions an alternative embodiment of the present invention includes, in addition to selecting the "on" state under the conditions specified by the algorithms I, II, III, IV, and V, provisions for also selecting the "on" state or otherwise applying a force for relative displacements beyond the limits. For example, damper assembly 26 be switched to the "on" state for $x_{rel}$ greater than $x_{+limit}$ or less than $x_{-limit}$. Alternatively, if the absolute value of the relative velocity $|v_{rel}|$ is greater than a preselected velocity deadband "$v_{db}$", and if $x_{rel}$ is greater than $x_{+limit}$ or less than $x_{-limit}$ then the damper assembly 26 be switched to the "on" damping state if $x_{rel}v_{rel}$ is greater than zero but be switched to the "off" damping state if $x_{rel}v_{rel}$ is less than zero. It is understood that other options could be used for switching the damper for relative displacements $x_{rel}$ outside the displacement limits $x_{+limit}$ and $x_{-limit}$, and such options do not alter the spirit of the invention.

It is also understood that the invention as described in algorithms I, II, III, IV, and V could be included within a system that includes two or more independently controlled suspension mechanisms 5, such as an automotive suspension where the four suspension mechanism corresponding to those at each of the four wheel locations. In such a system each location can be individually controlled and, in addition to the invention described above for isolating and controlling each of the individual suspensions, a central controller could override or bias the selection of the "on" or "off" state of a two-stage adjustable damper at each of the suspension locations based on combined inputs from all the suspension mechanism, or from other inputs. The fact that additional information beyond the system variables of an individual suspension may be used as a basis for an override or biasing of the selected damper state does not alter the spirit of the invention.

EXAMPLES

To demonstrate improvement in controlling the relative motion between two elements to maximize isolation between the elements while minimize the instances of the motion exceeding acceptable limits between the elements using the current invention, a computer simulation model is used. This model compares the simulated steady state and transient input performance of a suspension system using a specific two state "on/off" damper controlled by the algorithms of the current invention, to the simulated performance of a suspension system using 1) a passive damper with relatively high damping designed to limit the relative motion between the two elements, and 2) the "on/off" damper in the "off" state. The adjustable damper in the "off" state is essentially a relatively low damped passive damper. The system modeled is a seat suspension with a sprung mass m equal to 95 kg. The primary spring assembly 24 has a fixed spring constant k equal to 5.86 kN/m resulting in a natural frequency of 1.25 Hz for the seat. The displacement from the equilibrium position $x_{rel}=0$ to the positive and negative displacement limits $x_{+limit}$ and $x_{-limit}$ of the suspension mechanism 5 are +50 mm and −50 mm respectively. The end stops 51 and 53 are modeled to be rubber bushings with a linear spring rate of 900 kN/m. The passive damper modeled is a linear damper (force F between elements 12 and 14 equals damping parameter C' times the relative velocity $v_{rel}$, $F=C'v_{rel}$) where the damping parameter in the jounce direction equals 0.5 of critical ($C_{critical}=2\sqrt{km}$) and the damping parameter in the rebound direction equals 0.67 of critical, such that $C_{jounce}=746$ N-s/m and $C_{rebound}=1000$ N-s/m. The "on/off" damper assembly 26 is also modeled as a linear damper as defined above with jounce damping parameter equal to the rebound damping parameter in both the "off" and "on" states. The "off" state damping parameter is 0.15 of critical, C=224 N-s/m, and the "on" state damping parameter equals critical damping $C_{on}=1,490$ N-s/m. In the model, the $\zeta$ variable in algorithms III and IV is set to 1. The total response time of the semi-active system including the controller 60, power source 76 and damper assembly 26 is set equal to 0.005 seconds, and appropriate frequency filters are used. Since in this model, the spring constant k and the "off" state damping parameter C are fixed and since no additional forces are included, the system force in this model is $F_{sys}=-kx_{rel}-Cv_{rel}$.

Figure 9:
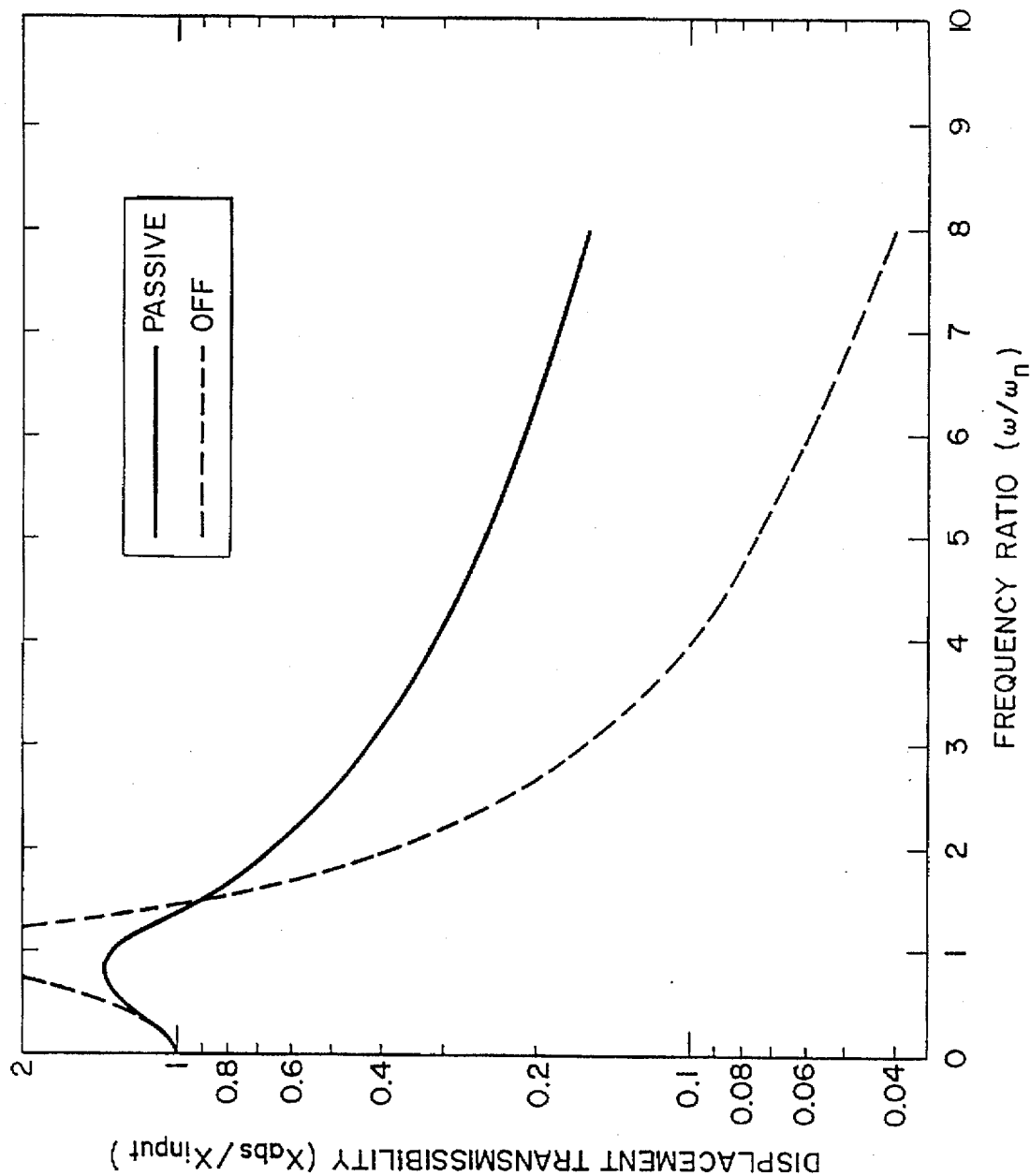
FIG. 9 is a displacement transmissibility plot of a suspension simulations of a high-damped passive damper and a two-stage adjustable damper in the low force "off" state.
Figure 11:
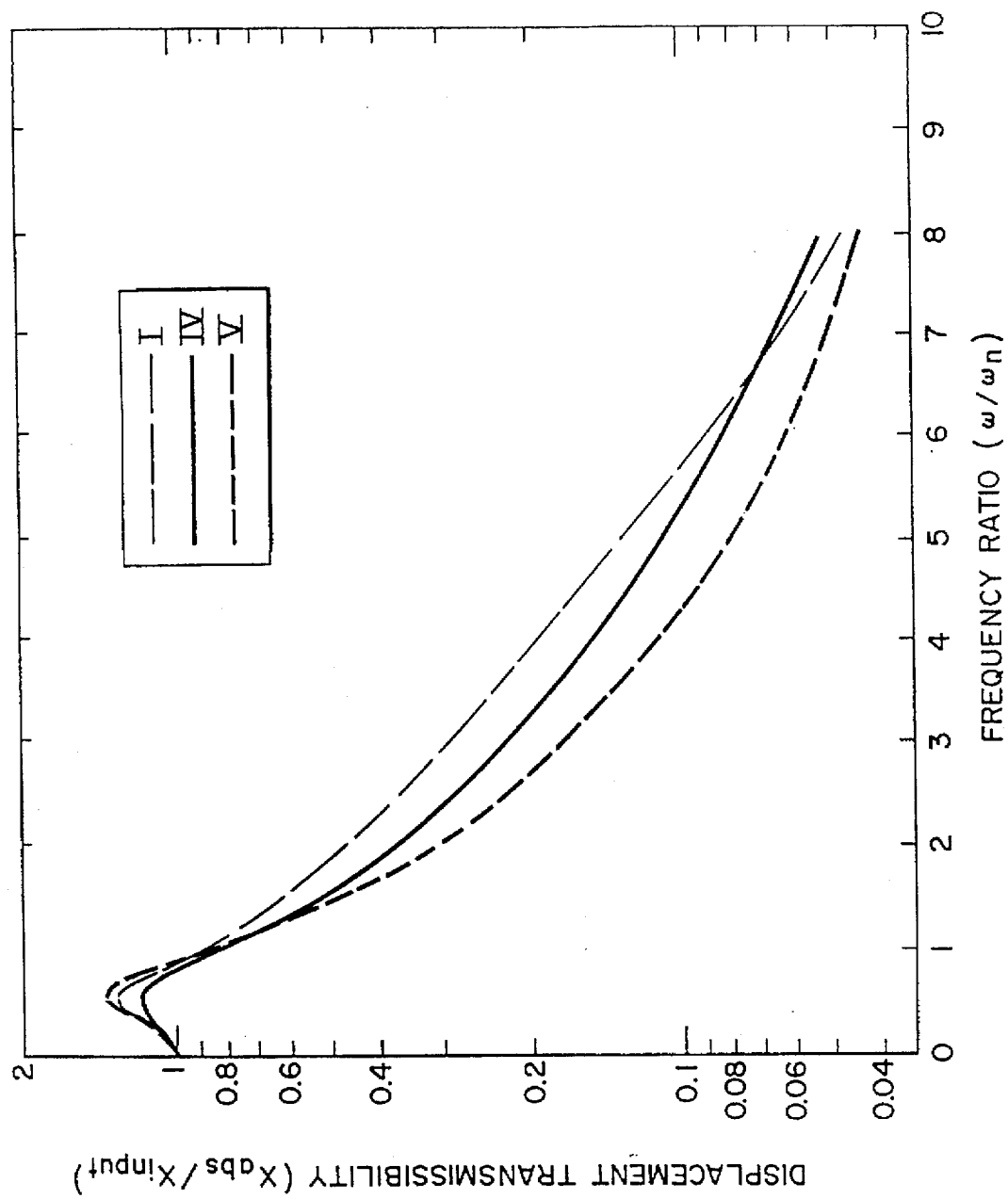
FIG. 11 is a displacement transmissibility plot of a suspension simulations of a two-stage adjustable damper control by the algorithms of FIGS. 4, 7, and 8.
Figure 13:
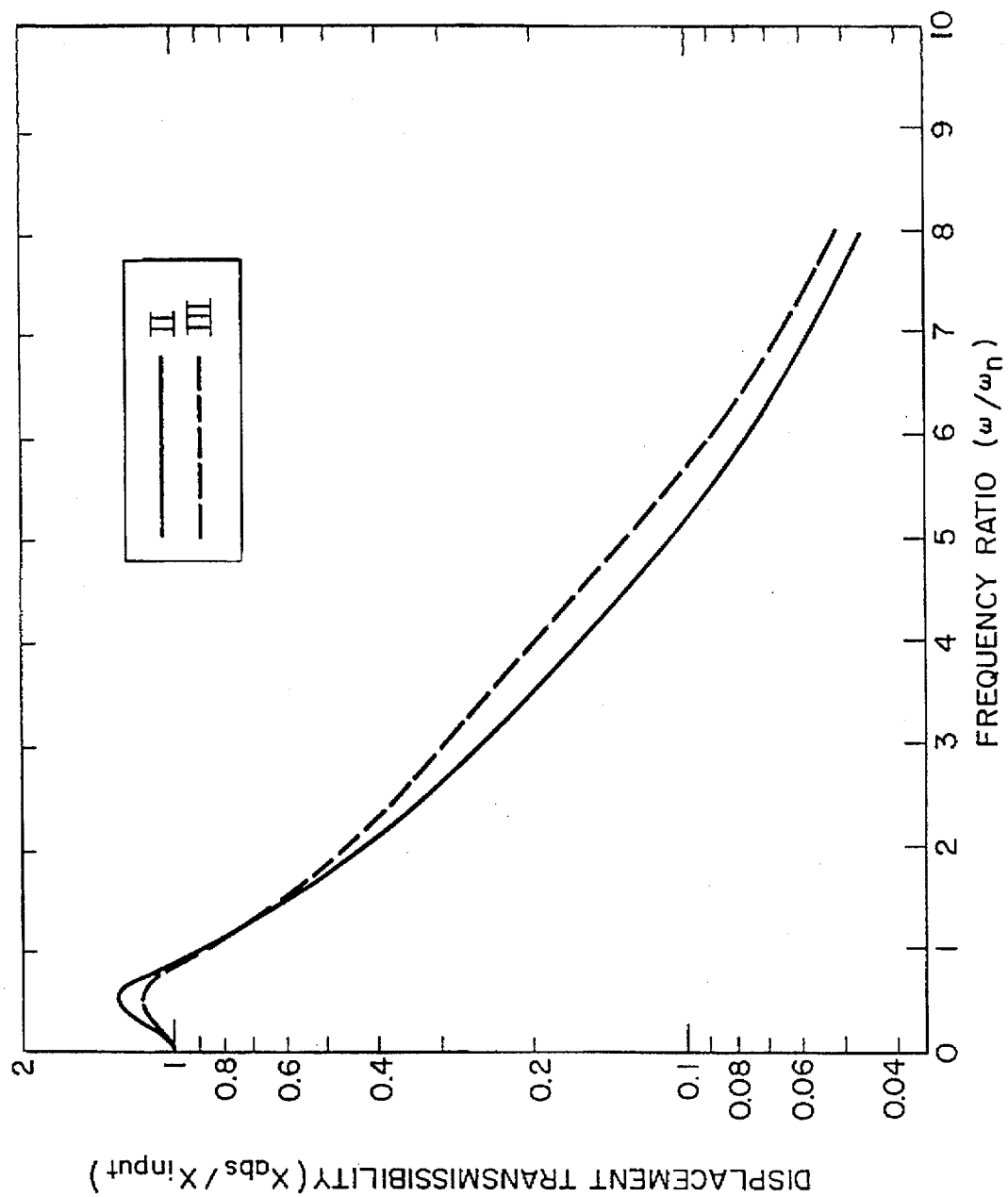
FIG. 13 is a displacement transmissibility plot of a suspension simulations of a two-stage adjustable damper control by the algorithms of FIGS. 5, and 6.

To demonstrate isolation of the control algorithms, FIGS. 9, 11 and 13 show the displacement transmissibility, which is the displacement of the sprung element 12 relative to the ground reference frame, $x_{abs}$, divided by the displacement of the unsprung element 14 relative to the ground reference frame, $x_{input}$, as a function of frequency ratio (input frequency divided by natural frequency $\omega/\omega_n$). The frequency ratio is varied from 0.25 times the natural frequency (0.31 Hz) to 8 times the natural frequency (10 HZ). For frequency ratios greater than or equal to 1, the displacement input is selected for a 2.35 m/s$^2$ acceleration. Hence, at 1.25 Hz, the input displacement is ±38 min. At frequency ratios less than 1, the displacement input is ±40 mm.

Figure 10:
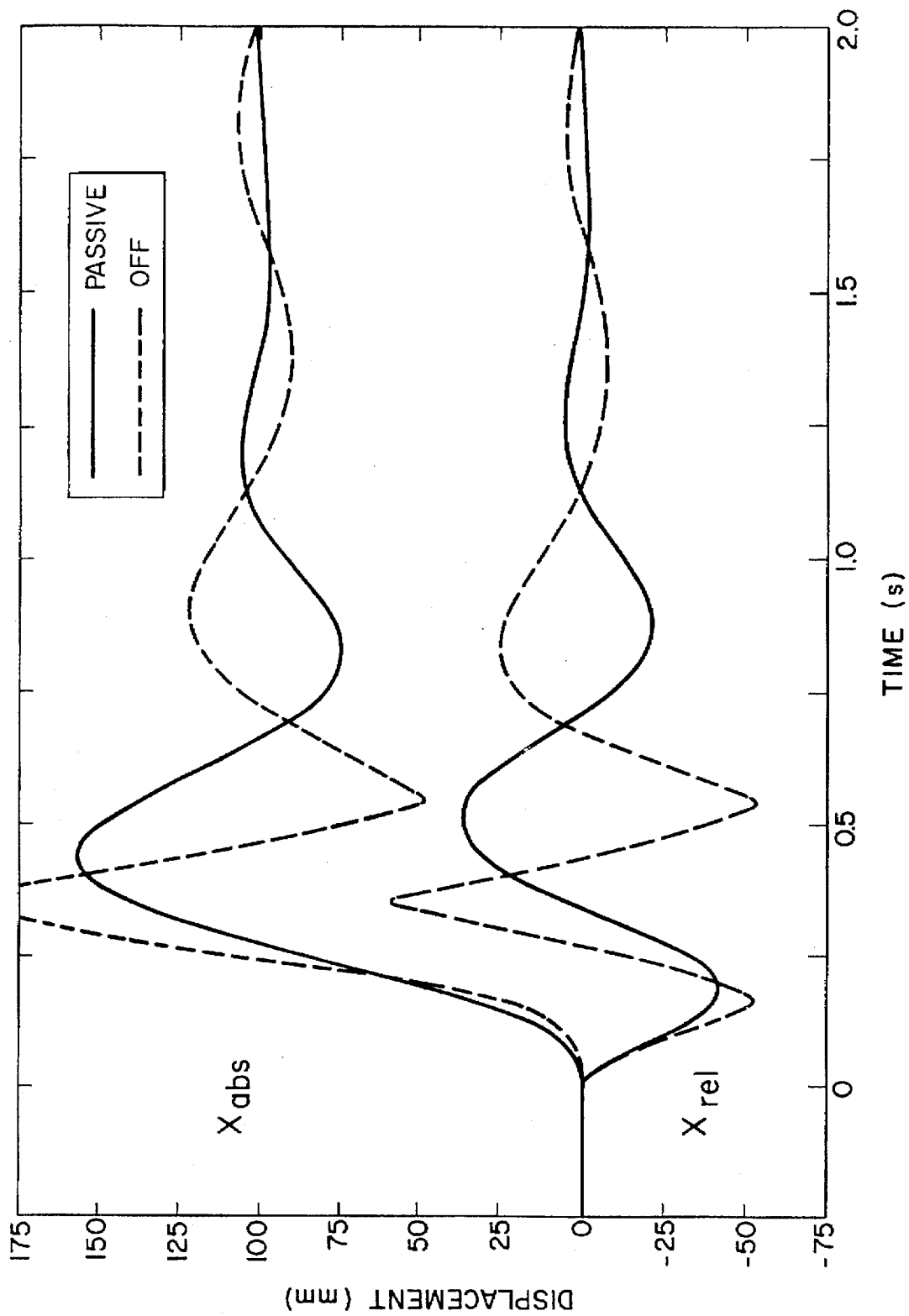
FIG. 10 is a plot of relative and absolute displacements of a simulated step input to a suspensions with a high-damped passive damper and with a two-stage adjustable damper in the low force "off" state.
Figure 12:
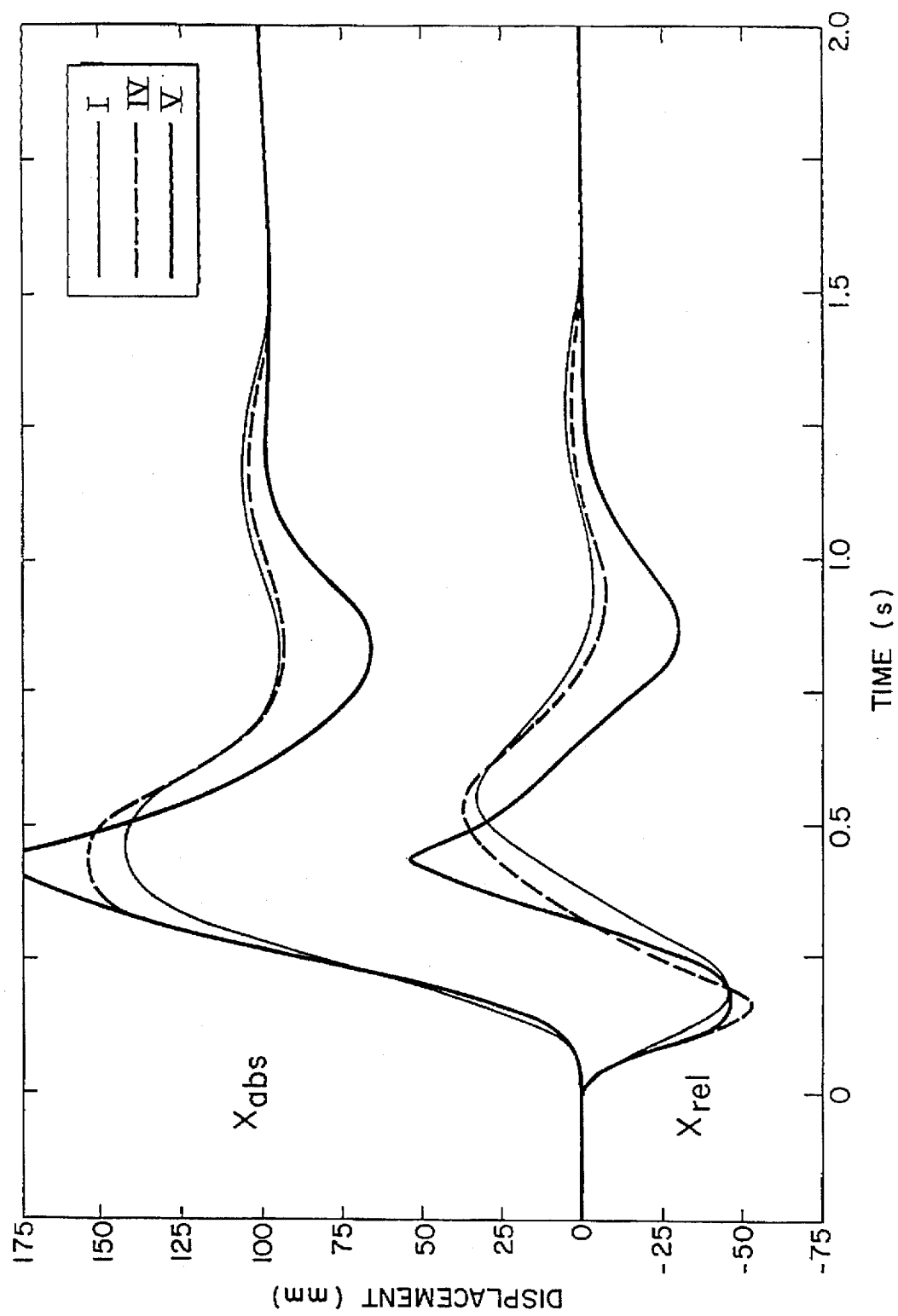
FIG. 12 is a plot of relative and absolute displacements of a simulated step input to a suspensions with a two-stage adjustable damper control by the algorithms of FIGS. 4, 7, and 8.
Figure 14:
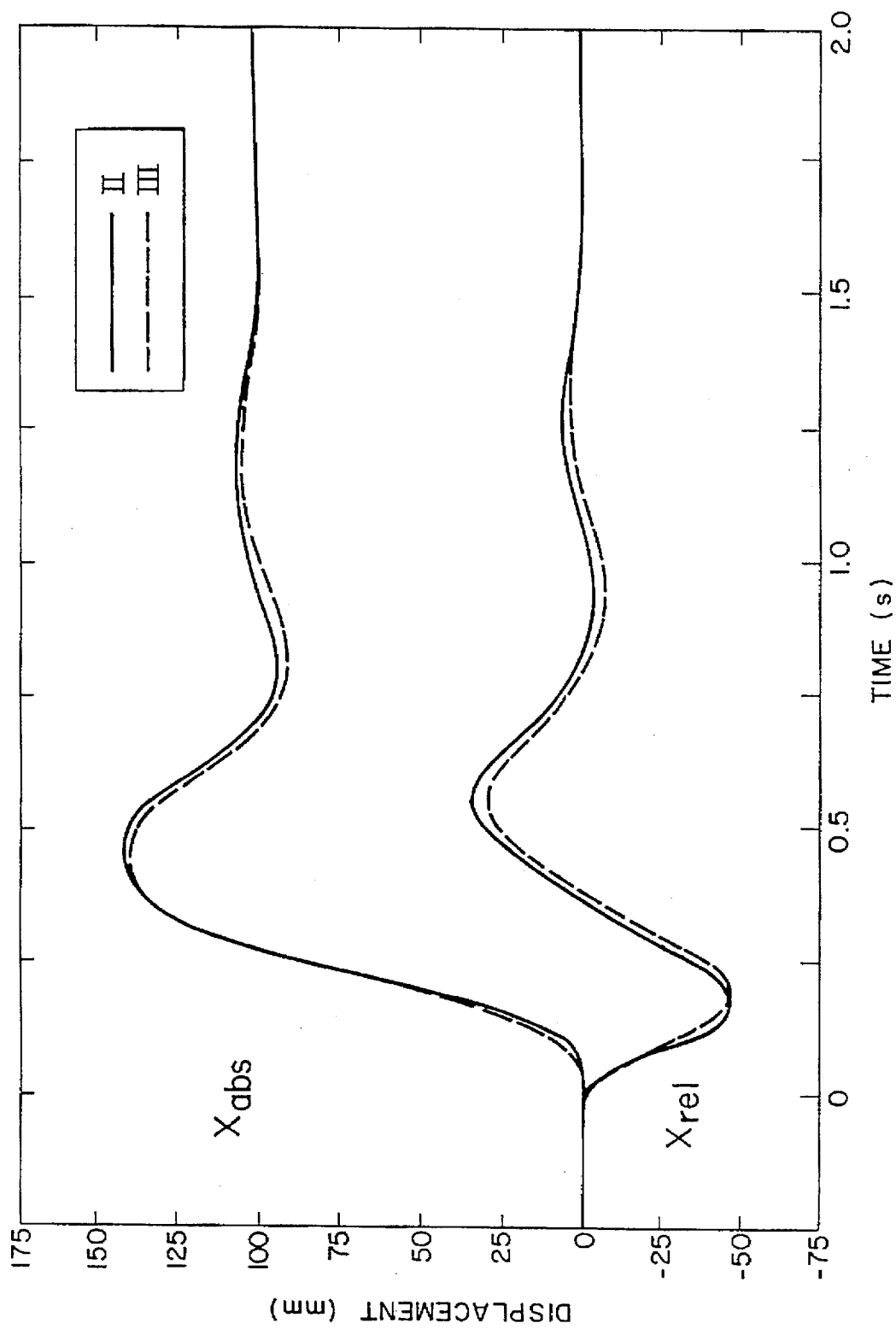
FIG. 14 is a plot of relative and absolute displacements of a simulated step input to a suspensions with a two-stage adjustable damper control by the algorithms of FIGS. 5 and 6.
Figure 15:
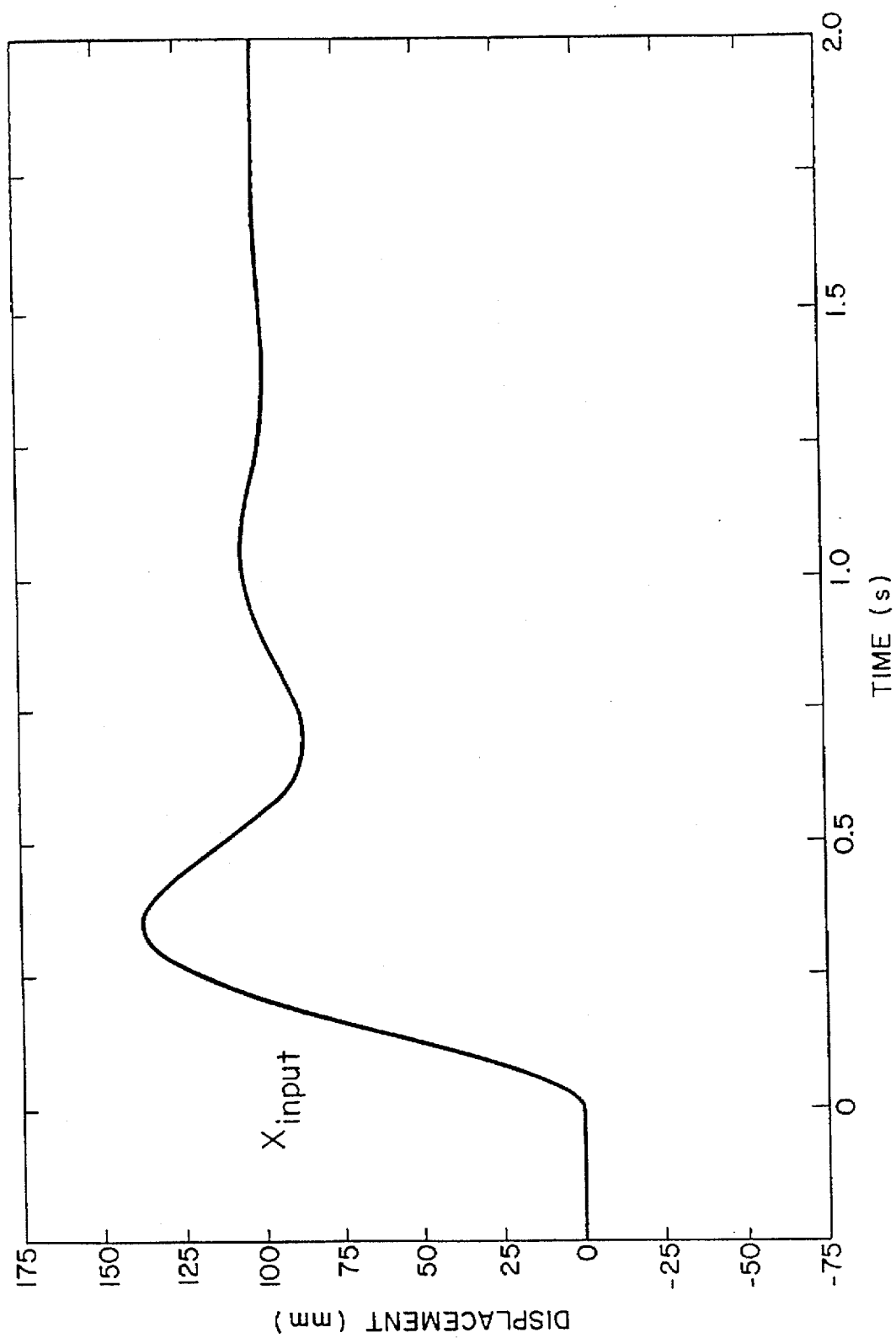
FIG. 15 is the displacement input to the suspension when generating the plots of FIGS. 12, and 14.

To demonstrate the algorithm's ability to avoid large displacements in which $x_{rel}$ exceeds $x_{+limit}$ and $x_{-limit}$, FIGS. 10, 12 and 14 show the motion for a seat 10 mounted on a vehicle cab 16, where a 100 mm step input is applied to the cab suspension. The seat motion is shown both as a displacement relative to the cab $x_{rel}$ and relative to the ground reference frame $x_{abs}$. The suspension of the vehicle cab is modeled to have a natural frequency of 1.5 Hz and a damping ratio of 0.3, such that the resulting displacement input to the base 22 of the seat 10 is shown in FIG. 15.

Referring now to FIG. 9, the displacement transmissibility curves for the high-damped passive damper and the adjustable damper in the low-damped "off" state show a typical problem with passive dampers (i.e., without the control algorithms of the present invention). While the high-damped passive damper provides relatively good isolation near resonance (frequency ratio equal to 1), the low-damped "off" damper provides significantly better isolation at frequency ratios above 1.5. The better isolation at high frequency results in better ride comfort for most road inputs; however, better isolation near resonance in linear dampers is needed to control large road inputs. Referring now to FIG. 10, the relative displacement $x_{rel}$ and the absolute displacement $x_{abs}$ curves for the adjustable damper in the "off" state demonstrate curves of a seat that exceeds the stroke limits of the suspension. The abrupt direction changes in the relative displacement $x_{rel}$ performance of the "off" state damper are due to contact with the end stops 51, 53 at the +50 mm and −50 mm positions of $x_{+limit}$, $x_{-limit}$ respectively. In particular, the "off" adjustable damper exceeds the stroke limit three times before sufficient damping occurs to control the motion of the seat between the displacement limits $x_{+limit}$, $x_{-limit}$. Indeed the "off" adjustable damper can only control the displacement of the seat within the displacement limits for transient inputs of the type modeled here with amplitudes less than 51 mm. The highly damped passive damper demonstrates good control of the transient input with the suspension displacement remaining within the displacement limits. In fact, the highly damped passive damper can control the displacement of the seat within the displacement limits for transient inputs of the type modeled here with amplitudes up to 121 mm. Ideally, an improved seat control algorithm for a two-stage adjustable damper is one that allows for the good high frequency isolation of the damper in the "off" state, while providing good transient-input stroke control of the high-damped passive damper.

Referring now to FIGS. 11 and 12, the isolation and stroke limiting ability of control algorithms I, IV, and V are demonstrated in a displacement transmissibility plot and a transient response plot respectively. In displacement transmissibility, algorithm V shows significantly better low frequency isolation than the passive damper and high frequency isolation that is comparable to the "off" adjustable damper. Algorithm IV has even better low frequency isolation; however, the high frequency isolation is not good as that of algorithm V. With 100 mm transient input, both algorithm IV and V allow contact with the end-stops; however, both can control the displacement of the seat within displacement limits for transient inputs of the type modeled here with amplitudes less than 84 mm, which is a 67% greater input than that controlled by the "off" damper. Algorithm I has better high frequency and low frequency isolation than the passive damper, controls the seat motion to prevent contact With the end stops in the 100 mm transient input, and allows transient inputs up to 160 mm before the end stops are contacted, a 33% improvement over the passive damper.

Referring now to FIGS. 13 and 14, the isolation and stroke limiting ability of control algorithms II and III are demonstrated in a displacement transmissibility plot and a transient response plot respectively. Both show improved low frequency isolation relative to the passive damper and both show high frequency isolation similar to the "off" adjustable damper. Each algorithm prevents the seat from contacting the stroke limits with the 100 mm transient input. In this model algorithms II and III prevent contact with the end-stops for transient inputs up to 160 mm.

In general, the simulation model used here shows the good high frequency performance of algorithms I, II, III, IV and V when compared to the "off" state of the adjustable damper and shows the stroke limiting capability of the algorithms with large displacement transient inputs. Algorithms I, II and III with the two state "on/off" damper show better stroke control than the high-damped passive damper. Algorithms IV and V show significantly better stroke control than the "off" state of the adjustable damper.

Each of the documents referred to above is incorporated herein by reference. As used herein, the expression "consisting essentially of" permits the inclusion of substances which do not materially affect the basic and novel characteristics of the composition under consideration.

What is claimed is:

1. A method for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; the extreme limits of acceptable displacement of said elements being between of $x_{+limit}$ in a positively defined direction and $x_{-limit}$ in a negatively fined direction; said elements being provided with a means for applying a second force therebetween, opposed to the direction of the relative motion of the elements, which means can be switched between a state characterized by a high force and a state characterized by a low force, the difference between said high force and said low force being defined as the controlled force; said method comprising:

(a) measuring the displacement $x_{rel}$ of the second element relative to the first element, $x_{rel}$ being defined as zero at the equilibrium position;
    (b) determining the relative velocity $v_{rel}$ of the two elements; and
    (c) applying the high force between the first and second elements if $$|v_{rel}| > v_{db} \text{ and } v_{rel}^2 > -\frac{2dF_{sys}}{m},$$

otherwise applying the low force;
where:
$v_{db}$ is a velocity deadband with a preselected value greater than or equal to zero,
m is the effective mass of the second element,
d is the distance from the displacement $x_{rel}$ to the acceptable extreme displacement limit $x_{+limit}$ or $x_{-limit}$ in the direction of the relative velocity $v_{rel}$,
$F_{sys}$ is the sum of the forces acting between the first and second elements other than the controlled force of the second force means;
whereby the force transmitted from the first element to the second element and the relative displacement between said elements are controlled.

2. The method of claim 1 wherein $F_{sys}$ is taken as $F_{sys}=-kx'-Cv_{rel}$, where, x' is the relative displacement of the elements in excess of a displacement deadband $x_{db}$ with a preselected value of zero or greater, such that x'=0 if $|x_{rel}| \leq x_{db}$ and $x'=x_{rel}-x_{db} \, \text{sgn}(x_{rel})$ if $|x_{rel}|>x_{db}$, k is the spring rate of the spring assembly at displacement $x_{rel}$, and C is an adjustable constant.

3. The method of claim 1 wherein the means for applying the second force is a damper containing a field responsive fluid.

4. The method of claim 1 wherein the first element comprises a vehicle chassis and the second element comprises an engine, a tractor cab, or a seat, suspended thereon.

5. The method of claim 1 wherein the first element is a wheel assembly and the second element comprises a vehicle body, and wherein mass m is taken as that portion of the total mass of the vehicle body which is supported by said wheel assembly when said vehicle body is at rest.

6. The method of claim 1 wherein the high force is additionally applied if $v_{rel}F_{sys}>0$.

7. The method of claim 6 wherein $F_{sys}$ is taken as $F_{sys}=-kx'-Cv_{rel}$, where, x' is the relative displacement of the elements in excess of a displacement deadband $x_{db}$ with a preselected value of zero or greater, such that x'=0 if $|x_{rel}| \leq x_{db}$ and $x'=x_{rel}-x_{db} \, \text{sgn}(x_{rel})$ if $|x_{rel}|>x_{db}$, k is the spring rate of the spring assembly at displacement $x_{rel}$, and C is an adjustable constant.

8. The method of claim 6 wherein the means for applying the second force is a damper containing a field responsive fluid.

9. The method of claim 6 wherein the first element comprises a vehicle chassis and the second element comprises an engine, a tractor cab, or a seat, suspended thereon.

10. The method of claim 6 wherein the first element is a wheel assembly and the second element comprises a vehicle body, and wherein mass m is taken as that portion of the total mass of the vehicle body which is supported by said wheel assembly when said vehicle body is at rest.

11. The method of claim 1, further comprising measuring the absolute acceleration of the second element and calculating the absolute velocity $v_{abs}$ of the second element, and wherein the high force is additionally applied if $$v_{rel}v_{abs} > \frac{v_{rel}F_{sys}}{2\zeta\sqrt{km}};$$

where $\zeta$ is a number greater than 0 and less than or equal to 1, and k is the spring rate of the spring assembly at the relative displacement $X_{rel}$.

12. The method of claim 11 wherein $F_{sys}$ is taken as $F_{sys}=-kx'-Cv_{rel}$, where, x' is the relative displacement of the elements in excess of a displacement deadband $x_{db}$ with a preselected value of zero or greater, such that x'=0 if $|x_{rel}| \leq x_{db}$ and $x'=x_{rel}-x_{db} \, \text{sgn}(x_{rel})$ if $|x_{rel}|>x_{db}$, and C is an adjustable constant.

13. The method of claim 11 wherein the means for applying the second force is a damper containing a field responsive fluid.

14. The method of claim 11 wherein the first element comprises a vehicle chassis and the second element comprises an engine, a tractor cab, or a seat, suspended thereon.

15. The method of claim 11 wherein the first element is a wheel assembly and the second element comprises a vehicle body, and wherein mass m is taken as that portion of the total mass of the vehicle body which is supported by said wheel assembly when said vehicle body is at rest.

16. A method for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements being situated within extreme limits of acceptable displacement therebetween of $x_{+limit}$ in a positively defined direction and $x_{-limit}$ in a negatively defined direction; said elements being provided with a means for applying a second force therebetween, opposed to the direction of the relative motion of the elements, which means can be switched between a state characterized by a high force and a state characterized by a low force, the difference between said high force and said low force being defined as the controlled force; said method comprising:

(a) measuring (i) the displacement $x_{rel}$ of the second element relative to the first element, $x_{rel}$ being defined as zero at the equilibrium position; and (ii) the absolute acceleration of the second element;

(b) determining (i) the relative velocity $v_{rel}$ of the elements and (ii) the absolute velocity $v_{abs}$ of the second element; and (c) applying the high force between the first and second elements if $$|v_{rel}| > v_{db} \text{ and } v_{rel}v_{bs} > \frac{v_{rel}F_{sys}}{2\zeta\sqrt{km}},$$

otherwise applying the low force;
where:
$v_{db}$ is a velocity deadband with a preselected value greater than or equal to zero,
m is the effective mass of the second element,
k is the spring rate of the spring assembly at the relative displacement $x_{rel}$,
$F_{sys}$ is the sum of the forces acting between the first and second elements other than the controlled force of the second force means,
$\zeta$ is a number greater than 0 and less than or equal to 1;
whereby the force transmitted from the first element to the second element and the relative displacement between said elements are controlled.

17. The method of claim 16 where $F_{sys}$ is approximated by $F_{sys}=-kx'-Cv_{rel}$, where, x' is the relative displacement of the elements in excess of a displacement deadband $x_{db}$ with a preselected value of zero or greater, such that x'=0 if $|x_{rel}| \leq x_{db}$ and $x'=x_{rel}-x_{db} \, \text{sgn}(x_{rel})$ if $|x_{rel}|>x_{db}$, k is the spring rate of the spring assembly at displacement $x_{rel}$, and C is an adjustable constant.

18. The method of claim 16 wherein the means for applying the second force is a damper containing a field responsive fluid.

19. The method of claim 16 wherein the first element comprises a vehicle chassis and the second element comprises an engine, a tractor cab, or a seat, suspended thereon.

20. The method of claim 16 wherein the first element is a wheel assembly and the second element comprises a vehicle body, and wherein mass m is taken as that portion of the total mass of the vehicle body which is supported by said wheel assembly when said vehicle body is at rest.

21. A method for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements being situated within extreme limits of acceptable displacement therebetween of $x_{+limit}$ in a positively defined direction and $x_{-limit}$ in a negatively defined direction; said elements being provided with a means for applying a second force therebetween, opposed to the direction of the relative motion of the elements, which means can be switched between a state characterized by a high force and a state characterized by a low force, the difference between said high force and said low force being defined as the controlled force; said method comprising:

(a) measuring the displacement $x_{rel}$ of the second element relative to the first element, $x_{rel}$ being defined as zero at the equilibrium position;

(b) determining the relative velocity $v_{rel}$ elements; and (c) applying the high force between the first and second elements if $$|v_{rel}| > v_{db} \text{ and } v_{rel}F_{sys} > 0,$$

otherwise applying the low force;
where:
$v_{db}$ is a velocity deadband with a preselected value greater than or equal to zero,
$F_{sys}$ is the sum of the forces acting between the first and second elements other than the controlled force of the second force means;
whereby the force transmitted from the first element to the second element and the relative displacement between said elements are controlled.

22. The method of claim 21 where $F_{sys}$ is approximated by $F_{sys}=-kx'-Cv_{rel}$, where, x' is the relative displacement of the elements in excess of a displacement deadband $x_{db}$ with a preselected value of zero or greater, such that x'=0 if $|x_{rel}| \leq x_{db}$ and $x'=x_{rel}-x_{db} \, \text{sgn}(x_{rel})$ if $|x_{rel}|>x_{db}$, k is the spring rate of the spring assembly at displacement $x_{rel}$, and C is an adjustable constant.

23. The method of claim 21 wherein the means for applying the second force is a damper containing a field responsive fluid.

24. The method of claim 21 wherein the first element comprises a vehicle chassis and the second element comprises an engine, a tractor cab, or a seat, suspended thereon.

25. The method of claim 21 wherein the first element is a wheel assembly and the second element comprises a vehicle body, and wherein mass m is taken as that portion of the total mass of the vehicle body which is supported by said wheel assembly when said vehicle body is at rest.

26. A device for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements having extreme limits of acceptable displacement therebetween of $x_{+limit}$ in a positively defined direction and $x_{-limit}$ in a negatively defined direction; said device comprising:

(A) a damper for applying a second force between said two movably interconnected elements, which damper can be switched between an "on" state characterized by a high force and an "off" state characterized by a low force, the difference between said high force and said low force being defined as the controlled force; and (B) a controller adapted to send a control signal to said damper in response to the condition of the two movably interconnected elements, said control signal corresponding to the high force state or the low force state of said damper;

wherein the controller is adapted to select the high force state if $$|v_{rel}| > v_{db} \text{ and } v_{rel}^2 > -\frac{2dF_{sys}}{m},$$

otherwise to select the low force state;
where:

$v_{db}$ is a velocity deadband with a preselected value greater than or equal to zero, $v_{rel}$ is the relative velocity of the two elements, m is the effective mass of the second element, d is the distance from the displacement $x_{rel}$ to the acceptable extreme displacement limit $x_{+limit}$ or $x_{-limit}$ in the direction of the relative velocity $v_{rel}$, and $F_{sys}$ is the sum of the forces acting between the first and second elements other than the controlled force of the damper.

27. The device of claim 26 wherein the controller is additionally adapted to select the high force state if $v_{rel}F_{sys}>0$.

28. The device of claim 26 wherein the controller is additionally adapted to select the high force if $$v_{rel}v_{abs} > \frac{v_{rel}F_{sys}}{2\zeta\sqrt{km}};$$

where $\zeta$ is a number greater than 0 and less than or equal to 1, and k is the spring rate of the spring assembly at the relative displacement $x_{rel}$.

29. A device for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements having extreme limits of acceptable displacement therebetween of $x_{+limit}$ in a positively defined direction and $x_{-limit}$ in a negatively defined direction; said device comprising:

(A) a damper for applying a second force between said two movably interconnected elements, which damper can be switched between an "on" state characterized by a high force and an "off" state characterized by a low force, the difference between said high force and said low force being defined as the controlled force; and (B) a controller adapted to send a control signal to said damper in response to the condition of the two movably interconnected elements, said control signal corresponding to the high force state or the low force state of said damper;

wherein the controller is adapted to select the high force state if $$|v_{rel}| > v_{db} \text{ and } v_{rel}v_{bs} > \frac{v_{rel}F_{sys}}{2\zeta\sqrt{km}},$$

otherwise to select the low force state;
where:

$v_{db}$ is a velocity deadband with a preselected value greater than or equal to zero, $v_{rel}$ is the relative velocity of the two elements, m is the effective mass of the second element, k is the spring rate of the spring assembly at the relative displacement $x_{rel}$, $F_{sys}$ is the sum of the forces acting between the first and second elements other than the controlled force of the damper, and $\zeta$ is a number greater than 0 and less than or equal to 1.

30. A device for controlling the relative motion between two elements movably interconnected through a linkage which includes a spring assembly which tends to maintain the elements at an equilibrium position, at least the first element thereof being subjected to externally generated motion inputs and tending to transmit a first force in response thereto to the second element thereof; said elements having extreme limits of acceptable displacement therebetween of $x_{+limit}$ in a positively defined direction and $x_{-limit}$ in a negatively defined direction; said device comprising:

(A) a damper for applying a second force between said two movably interconnected elements, which damper can be switched between an "on" state characterized by a high force and an "off" state characterized by a low force, the difference between said high force and said low force being defined as the controlled force; and (B) a controller adapted to send a control signal to said damper in response to the condition of the two movably interconnected elements, said control signal corresponding to the high force state or the low force state of said damper;

wherein the controller is adapted to select the high force state if $$|v_{rel}|>v_{db} \text{ and } v_{rel}F_{sys}>0,$$

otherwise to select the low force state;
where:

$v_{db}$ is a velocity deadband with a preselected value greater than or equal to zero, $v_{rel}$ is the relative velocity of the two elements, and $F_{sys}$ is the sum of the forces acting between the first and second elements other than the controlled force of damper.

* * * * *